(12) United States Patent
Roeper et al.

(10) Patent No.: US 12,163,506 B2
(45) Date of Patent: Dec. 10, 2024

(54) WIND TURBINE ICE PROTECTION SYSTEM FOR CONTROLLING ICE PROTECTION MEASURES OF AT LEAST ONE WIND TURBINE

(71) Applicant: FabricAir Canada Inc., Waterloo (CA)

(72) Inventors: Daniela Roeper, Waterloo (CA); Riley Doering, Waterloo (CA); Dylan Baxter, Waterloo (CA)

(73) Assignee: FabricAir Canada Inc., Waterloo (CA)

( * ) Notice: Subject to any disclaimer, the term of this patent is extended or adjusted under 35 U.S.C. 154(b) by 0 days.

(21) Appl. No.: 18/227,144

(22) Filed: Jul. 27, 2023

(65) Prior Publication Data

US 2024/0035449 A1 Feb. 1, 2024

Related U.S. Application Data

(60) Provisional application No. 63/392,725, filed on Jul. 27, 2022.

(51) Int. Cl.
*F03D 80/40* (2016.01)
*F03D 7/02* (2006.01)
(Continued)

(52) U.S. Cl.
CPC ........... *F03D 80/401* (2023.08); *F03D 7/048* (2013.01); *F03D 17/002* (2023.08); *F03D 80/40* (2016.05);
(Continued)

(58) Field of Classification Search
CPC ..................................................... F03D 7/048
See application file for complete search history.

(56) References Cited

U.S. PATENT DOCUMENTS 9,458,824 B2 * 10/2016 Giertz ....................... F03D 3/00
10,781,793 B2 * 9/2020 Demuth .................. F03D 7/047
(Continued)

FOREIGN PATENT DOCUMENTS

CN 206280198 U 6/2017
CN 207701300 U * 8/2018
(Continued)

OTHER PUBLICATIONS

EPO Search Report and Opinion of Foreign Filing of Instant Application (Year: 2023).*
(Continued)

*Primary Examiner* — David E Sosnowski
*Assistant Examiner* — Wesley Le Fisher
(74) *Attorney, Agent, or Firm* — Own Innovation; James W. Hinton

(57) ABSTRACT

Wind turbine ice protection control systems and methods for controlling ice protection measures at a wind turbine are provided. The ice protection control system operates in multiple locations: the first being at least one remote wind turbine site and the second at least one offsite control office location. The ice protection control system includes sensors on at least one wind turbine at least one remote site for sensing internal and external environmental conditions and/or wind turbine outputs. The sensors output data which is received by a network at the wind turbine and then sent to a second network at an offsite location where it is analyzed to determine actions to be taken. In this way, multiple wind turbines at multiple wind turbine remote sites can be controlled by a single control system. Systems and methods for creating, retrieving, and storing sensor data within the ice protection control systems are also discussed.

20 Claims, 15 Drawing Sheets

(51) Int. Cl.
*F03D 7/04* (2006.01)
*F03D 17/00* (2016.01)

(52) U.S. Cl.
CPC .......... *F03D 80/405* (2023.08); *F03D 7/0268* (2013.01); *F03D 17/028* (2023.08); *F05B 2270/303* (2013.01); *F05B 2270/80* (2013.01)

(56) References Cited

U.S. PATENT DOCUMENTS

| | | | | |
|---|---|---|---|---|
| 10,823,152 | B2* | 11/2020 | Roeper | F03D 80/40 |
| 10,982,657 | B2* | 4/2021 | Gregory | F03D 7/024 |
| 11,952,985 | B2* | 4/2024 | Bosukonda | F03D 7/0264 |
| 2016/0115942 | A1* | 4/2016 | Noto | F03D 9/257 |
| | | | | 290/44 |
| 2017/0370348 | A1* | 12/2017 | Wilson | F03D 7/0224 |
| 2022/0003210 | A1* | 1/2022 | Bertelsen | F03D 80/40 |
| 2023/0250806 | A1* | 8/2023 | Brody | F03D 17/033 |
| | | | | 416/61 |

FOREIGN PATENT DOCUMENTS

| | | | |
|---|---|---|---|
| CN | 113357104 | A | 9/2021 |
| CN | 113446171 | A * | 9/2021 |
| CN | 113847216 | A | 12/2021 |
| DE | 102019117874 | A1 * | 1/2021 |

OTHER PUBLICATIONS

English translation of CN113446171A (Year: 2021).*
English Translation of DE102019117874A1 (Year: 2021).*
English Translation of CN207701300U (Year: 2019).*
Extended European Search Report from corresponding EP App. No. 23188264.8.

* cited by examiner

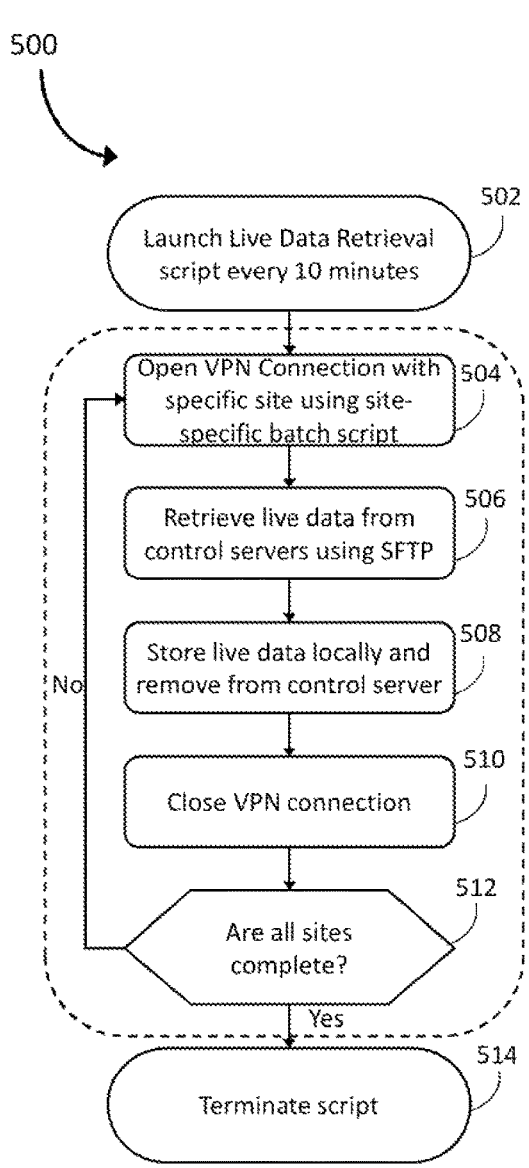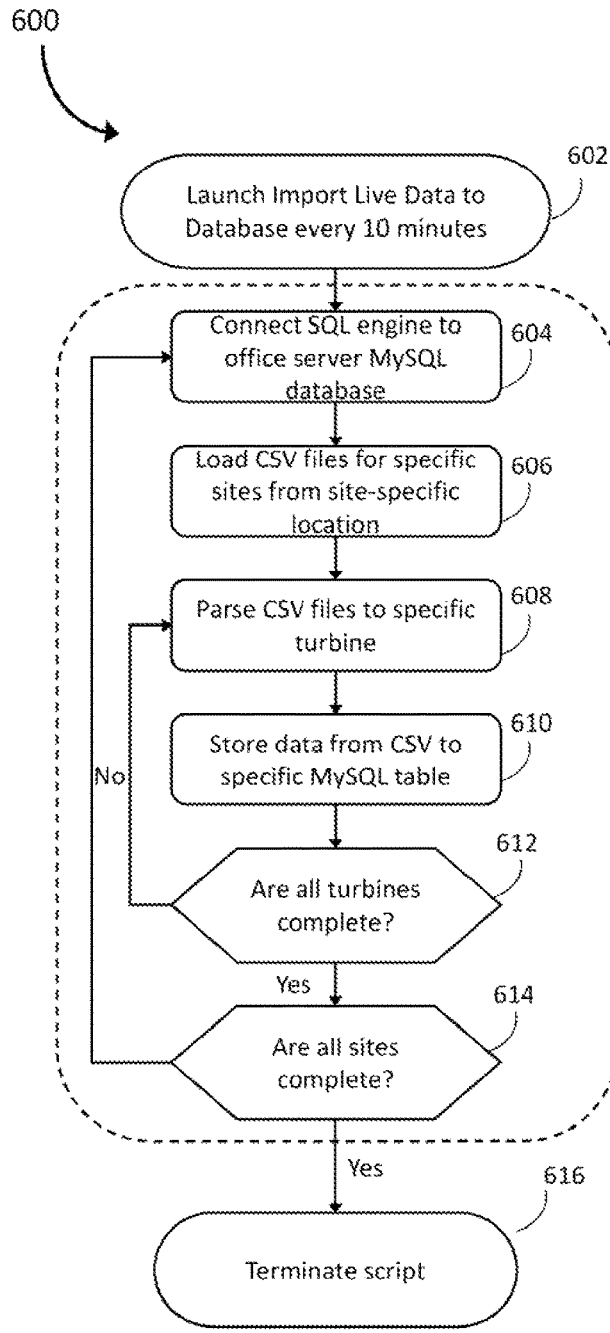
Figure 5
Figure 6

WIND TURBINE ICE PROTECTION SYSTEM FOR CONTROLLING ICE PROTECTION MEASURES OF AT LEAST ONE WIND TURBINE

TECHNICAL FIELD

The embodiments disclosed herein relate to wind turbine subsystems, and, in particular to ice protection control systems and methods for use in wind turbines.

INTRODUCTION

Wind resources for wind energy production may be located in cold, humid regions where ice may form on a blade of a wind turbine. Wind turbine blade icing may cause several problems for the operation of the wind turbine such as measurement error, prolonged power loss, mechanical failure, and safety hazards. Based on the profile of the blade, a critical area of icing may occur on the most distal third of the blade along the leading edge. The most distal third of the blade has the highest relative velocity and is therefore more likely to have ice buildup. Accordingly, it may be desirable to have a wind turbine blade ice protection system.

Conventional anti-icing systems may include the use of external coatings and paints. Further, conventional de-icing systems are often directly built into the blade during the manufacturing process of the blade. A retrofit of an existing blade involves a consideration of parameters such as energy, effect of additional mass of the system, and difficulty and cost of installation (as a retrofit). For example, these parameters indicate that a device embedded within fiberglass layers of the wind turbine blade may be unsuitable for retrofit for an existing wind turbine. Further, installation costs are a factor to be considered for externally installed devices. Fluids and machines on the blade may alter the dynamics of the system, especially as mass moves closer to the tip. Adding an ice protection system to the exterior of the blade may result in losses in power generation due to changes in aerodynamic properties of the blade that may outweigh benefits of recaptured power after icing events. Additionally, the external ice protection systems are exposed to harsh environmental conditions and erosion due to air and airborne objects, requiring frequent maintenance to maintain effectiveness.

In the aviation industry, various wing anti-icing and de-icing approaches have been considered and adopted over the past century. Methods for wing anti-icing and de-icing may include the use of anti-freeze sprays (e.g., ethylene glycol spray), pneumatic boots, and hot bleed air circulation.

Ethylene-glycol spray has been used on airplane wings as an anti-freeze spray. However, ethylene glycol spray does not de-ice, it only prevents ice formation, and only for a limited time period (e.g., 15 minutes). Such limited operative time periods work in aviation applications as the anti-freeze provides just enough time for the airplane to reach the upper atmosphere where icing is less severe. In contrast, the use of such an anti-freeze system in wind turbine applications would likely require the continuous supply of ethylene glycol spray, making the practice impractical and/or unsustainable.

Pneumatic boots use inflatable rubber strips on the leading edge of the wing blade. These methods offer alternatives to shedding ice without the energy-demanding method of providing heat to the iced regions. Although pneumatic boots may be successfully employed in the aviation industry, they are not perfect and fail to satisfy some of the specifications of wind turbines.

In the aviation industry, hot air systems are used as anti-icing systems and not as de-icing systems because the losses due to convection are significant at high airspeeds.

In wind turbines, conventional or existing approaches to ice protection or removal may fall short due to exceeding the available electrical energy capacity. Additionally, in many cases conventional systems either cannot be installed in the wind turbine or are extremely costly to implement as a retrofit.

Therefore, it may be desirable to have an improved wind turbine blade ice protection system that may provide a retrofit to existing blades.

Accordingly, ice protection systems and methods for wind turbines are desired that overcome at least some of the disadvantages of existing techniques.

SUMMARY

There is provided an ice protection control system for controlling wind turbine ice protection systems of at least one wind turbine, the system comprising: a first sensor subsystem of a first wind turbine, the first sensor subsystem including at least one sensor for collecting raw sensor data; a first controller communicatively connected to the first sensor subsystem and an ice protection system of the at least one wind turbine, the first controller configured to: receive the raw sensor data from the at least one sensor; generate processed sensor data from the raw sensor data; a site server at the location of the first wind turbine configured to receive and store the raw sensor data; and a first retrieval server at a location remote from the location of the first wind turbine, the first retrieval server configured to: receive the processed sensor data from the site server; analyse the processed sensor data; and generate heating mode instructions based on the analyzed processed sensor data and send the heating mode instructions to the first controller; and wherein the first controller is further configured to control a heating mode of the ice protection system according to the received heating mode instructions.

The first sensor subsystem may include at least one temperature sensor.

The first sensor subsystem may include at least one sensor chosen from the group consisting of: a blade-tip temperature sensor, a mid-blade temperature sensor, a blower inlet temperature sensor, an accelerometer, a pressure transducer, an ice sensor, a current sensor, a voltage sensor, an air velocity sensor, and an air pressure sensor.

The at least a first controller may be programmable logic controller.

The at least a first controller may include a first controller and a second controller, wherein the first controller receives voltage signals from the at least a first sensor and converts the voltage signals to digital signals to be sent to the second controller.

The system may further include a database server which receives and stores data from the at least a first controller and the at least a first retrieval server.

The retrieval server may be configured to actively retrieve data from the at least a first controller.

The at least a first retrieval server may be configured to receive processed sensor data from a plurality of controllers each representative of a different wind turbine or wind turbine blade.

The at least a first controller may be a device chosen from the group consisting of: a microcontroller, an industrial personal computer, a remote telemetry unit, a programmable automation controller, an embedded controller, an ethernet I/O module, or a smart relay.

Other aspects and features will become apparent to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification.

FIG. 5 is a block diagram of a method of retrieving live data from a remote wind turbine site, in accordance with an embodiment.

FIG. 6 is a block diagram of a method of importing live data from a remote wind turbine site, in accordance with an embodiment.

FIG. 10b is a block diagram of exemplary sub-steps of the method of FIG. 10a.

FIG. 10c is a block diagram of exemplary sub-steps of the method of FIG. 10a.

FIG. 10d is a block diagram of exemplary sub-steps of the method of FIG. 10a.

FIG. 10e is a block diagram of exemplary sub-steps of the method of FIG. 10a.

FIG. 10f is a block diagram of exemplary sub-steps of the method of FIG. 10a.

FIG. 10g is a block diagram of exemplary sub-steps of the method of FIG. 10a.

FIG. 10h is a block diagram of exemplary sub-steps of the method of FIG. 10a.

FIG. 10i is a block diagram of exemplary sub-steps of the method of FIG. 10a.

FIG. 10j is a block diagram of exemplary sub-steps of the method of FIG. 10a.

FIG. 10k is a block diagram of exemplary sub-steps of the method of FIG. 10a.

FIG. 10l is a block diagram of exemplary sub-steps of the method of FIG. 10a.

FIG. 10m is a block diagram of exemplary sub-steps of the method of FIG. 10a.

Figure 1A:
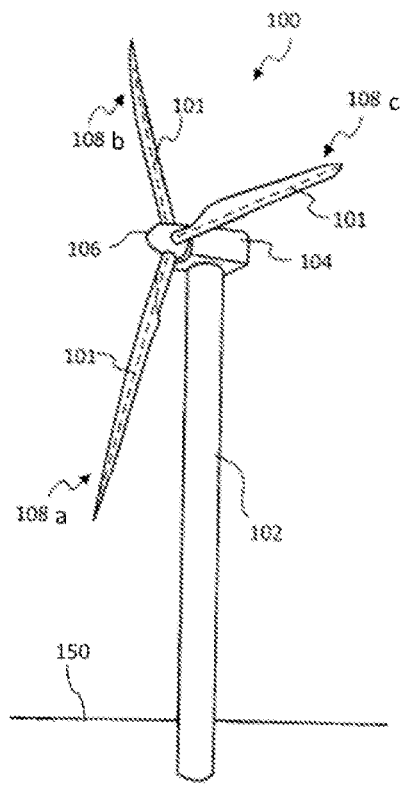
FIG. 1A is schematic diagram of a wind turbine including an ice protection system, in accordance with an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

The various embodiments described herein generally relate to ice protection methods and systems for a wind turbine blade. The present disclosure also provides systems and methods for mounting, installing, and supporting the ice protection system.

The systems and methods described herein provide an "ice protection" function for a wind turbine blade. "Ice protection" as used herein refers to protecting a wind turbine from negative effects of ice and includes "de-icing" and "anti-icing" functions. "De-icing" refers to the removal of ice from the wind turbine blade. "Anti-icing" refers to the prevention of ice formation on the wind turbine blade. That is, the ice protection systems of the present disclosure may be used to prevent ice from forming on a wind turbine blade and/or to remove ice that has already formed on a wind turbine blade. The ice protection system may include sensors which monitor environmental conditions of the wind turbine to turn on anti-icing functions, sensors which monitor the exterior of the wind turbine to turn on ice build-up removal, or both. The ice protection systems described herein protect the wind turbine from the negative effects of ice and may operate for both de-icing and anti-icing functions. The ice protection system may include sensors which monitor environmental conditions to compare historical weather events, forecasted weather events, or both in order to curtail the turbine, stop the turbine, set the turbine yaw position, set the turbine roll position, set the turbine pitch position, or any combination thereof with the final goal of reducing the amount of ice accumulation during an icing event, reducing the thermal load on the ice protection system, or both. Curtailing the turbine decreases the wind speed across the blades and may reduce the likelihood of ice accumulation. This same effect (but exaggerated) can be seen when stopping the turbine. This may only be beneficial if the curtailment is less than the power loss that would have occurred under a "full icing event". Stopping the turbine also increases the risk of ice accumulating in areas which the ice protection system may be less efficient, such as on the trailing edge. Yawing the turbine out of the wind may prevent ice accumulating on the leading edge and drastically reduce the heat loss on the exterior of the blade. Setting the turbine roll position may be beneficial. Pointing a blade towards the ground may shelter the blade from the higher winds above. Pointing a blade towards the sky may encourage heated air inside the blade to reach and stay at the tip of the blade (further enhancing the tip-to-root, heating direction).

The ice protection systems of the present disclosure may be integrated within an existing communication network of the wind turbine.

Discussed herein are various components of control system for an ice protection system. It is to be understood that the components of a control system and of an ice protection system may vary for different makes and models of wind turbines. For each make, model, or location of a wind turbine an "operational envelope" may need to be verified in order to ascertain the operation boundaries for the control system and the ice protection system. The "operational envelope" are the conditions under which the ice protection system should be active in order to facilitate the greatest production of power by the wind turbine when the power required by the ice protection system is accounted for.

It is also to be understood that the installation process of the ice protection system may occur at manufacture of the wind turbine or at other such time before deployment to a working location, at initial installation of the wind turbine at a working location, or as a retrofit of a wind turbine (i.e., of a wind turbine already in use). Different components may be required based on the circumstances of the installation.

Installation of the ice protection system may occur when a blade is grounded (e.g., about to be assembled onto the tower for the first time). Installation of the ice protection system may occur during blade manufacturing (e.g., before the top half of the blade is molded or before the bearing plate is attached). In such a case, the installer may have access to the inaccessible region of the blade (i.e., inaccessible when assembled) and may be able to install a system in this location which can aid in supporting a fabric duct. For example, the system may include a clothesline-type system where the fabric duct can be sent to the tip of the blade like a curtain. In another example, a rail system may be used so the fabric duct may be clipped to rollers and pushed towards the tip of the blade.

It is also to be understood that the order of the discussion about various components herein should not be taken as any indication as the order of installation or commissioning of the various components.

Broadly, the ice protection system discussed herein includes a heating system for heating an interior of the wind turbine blade and preventing or removing ice, an electronic control subsystem for controlling the components of the heating system, and an electrical system for providing power to electrical components of the heating system and electronic control subsystem. The ice protection system may include a plurality of heating systems, with one heating system in each blade of the wind turbine.

In an embodiment, a heating system includes a heater attached to an interior surface of the respective wind turbine blade, a blower for moving air across the heater to generate a heated airflow, a flexible duct to receive the heated airflow and distribute the heated airflow into an interior cavity of the wind turbine blade, a spine attached to the flexible duct, an interior surface of the wind turbine to support the flexible duct, and one or more duct supports attached to the spine which support the flexible duct.

In an embodiment, the control system includes at least one control panel, one or more sensors configured to monitor internal and/or external environmental conditions of the wind turbine blade, and control cables to connect the control system to the heating system. The control system receives information from the sensors and determines an operating state of the heating system. The operating state may be an on state or an off state. The operating state may also be a "cool down" state or a "start up" state. The "cool down" state turns off all heated elements but keep the blowers powered so that the air is circulated inside the blade until the heater elements reach a lower temperature. The "start-up" state staggers the starting time for electrical elements to accommodate for large electrical current requirements to start up the blowers and prevent over-current events which would cause fuses or circuit breakers to break. The operation modes may include heat single, heat alternate, heat all. The operating state may include additional information such as an operating level of the heating system (e.g., a temperature of air, an electrical current used, a number and identity of electric contractors engaged). The control system is further configured to generate a control signal based on the operating state determination. The control signal encodes instructions which, when received by the heating system, can be used to adjust an operating parameter of the heating system. The control system transmits the control signal to the heating system. In an embodiment, control system includes a sensor that is glued or otherwise attached to an inside surface of the blade to record a temperature of the blade material. This sensor may be located at a middle position (with respect to the distance from blade root to blade tip, and called a "mid-blade sensor"), or at the distal tip of the duct (attached to the duct or secured to the blade during manufacturing or with rope access technicians, and called a "tip sensor"), or behind the heater (a "rear-heater sensor"). The mid-blade and tip sensors are important for performance measurements (the sensor provides information on whether the heat from the heater is successfully transferring to the blade and towards the ice). The rear-heater sensor is used to provide information on whether the blade is experiencing temperatures near a safe limit of the blade (this may be the hottest spot in the system). The sensor components of the control system may be configured to monitor the external blade surface temperatures and ice thickness.

In an embodiment, the electrical system includes at least one electrical panel and a plurality of electrical cables. The electrical system provides power to the electrical components of the heating system and/or the control system. The electrical system may be an important part of the ice protection system as existing wind turbines do not generally have the capacity to power the added ice protection system using the components present in the wind turbine at manufacturing or commissioning. The electrical system is integrated with the existing wind turbine power system.

As discussed above, the operational envelope for each make and/or model of wind turbine may need to be determined. Additionally, the operational envelope for a wind turbine or group of wind turbines may need to be determined for the specific geographic location of the turbine(s). The operational envelope may be determined by first creating a theoretical model for the conditions under which the ice protection system should be active or inactive and testing the theoretical model against the "active power" and "available power" of the wind turbine. Conditions for which parameters may be chosen may include external temperature, external humidity, wind speeds, precipitation, ice thickness, ice type, internal blade temperature, etc. The "active power" is the current power output by the wind turbine and the "available power" is the power the wind turbine is capable of producing. "Power lost" can be computed by subtracting active power divided by available power from one. The power lost is computed when the ice protection system is running. The power lost can then be compared to an active wind turbine which either does not have an ice protection system or does not have an active ice protection system. Power lost by the wind turbine which is not running the ice protection system is subtracted from the power lost by the wind turbine with is running the ice protection system. The closer the value is to zero, the less effect the ice protection system is having on the functioning of the wind turbine. That is, if the value is close to zero, running the ice protection system did not increase the power output of the wind turbine. If the value is greater than zero than the ice protection system had a positive effect on power output. If the value is less than zero than the ice protection system had a negative effect on power output.

Testing the theoretical model over time results in validation (or invalidation) and refinement of the operational window. Defining the operational envelope by power output throughout the ice prevention/de-icing process allows for the goal of the ice protection system to be maximizing productivity of the wind turbine and not just minimizing ice build-up.

Figure 1B:
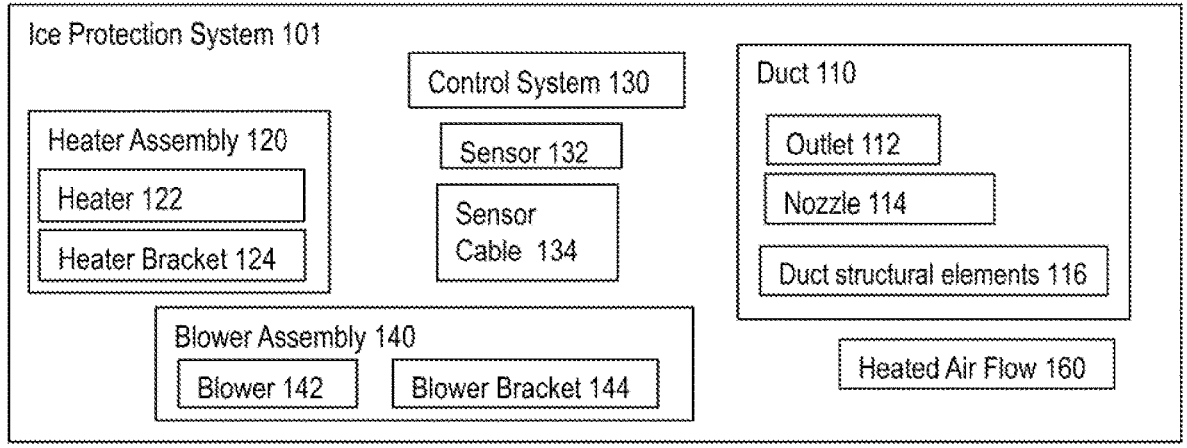
FIG. 1B is a block diagram of the ice protection system of FIG. 1A, according to an embodiment.

Reference will now be made to FIGS. 1A and 1B which provides brief overviews of the components of an example wind turbine and an example ice protection system.

Referring now to FIG. 1A, illustrated therein is a wind turbine 100 including an ice protection system 101, according to an embodiment.

The wind turbine 100 is used to convert wind energy into electric energy. In an embodiment, the wind energy may be kinetic energy. In this embodiment, the wind turbine 100 may use a mechanical electrical generator to perform the energy conversion.

The wind turbine 100 includes a tower 102, a nacelle 104, a hub (main shaft portion) 106, and a plurality of blades 108a, 108b, 108c (referred to generically as blade 108 and collectively as blades 108). The wind turbine 100 includes at least one blade 108. The tower 102 of the wind turbine 100 is physically connected to surface 150. The surface 150 may be ground. Ice may accumulate on an exterior surface of the blades 108.

The hub 106, which includes a main shaft portion, is coupled to a power transmission shaft (not shown) and rotatably disposed on the nacelle 104.

The nacelle 104 houses electrical and mechanical components of the wind turbine 100.

In an embodiment, the ice protection system 101 includes a plurality of operating modes. The power in each of the blades 108 does not have to be equal in all operating conditions. The operating modes may have different power requirements. Depending on environmental conditions (which may be sensed by sensors described herein), one of the operating modes will be most efficient for removing ice and/or preventing ice accumulation. The operating modes include a first operating mode (or "heat all" operating mode) in which all blades are being heated and all blades draw power. The power per blade in the first operating mode may be ⅓ total available power. The operating modes include a second operating mode (or "heat single" operating mode) in which only one blade is heated at a time and each blade is heated sequentially. The power per blade in the second operating mode may be equal to total available power. The operating modes include a third operating mode (or "heat alternate" operating mode) in which two blades are heated at a time and the pairs of blades are heated sequentially. The power per blade in the third operating mode may be ½ total available power. In an embodiment, a current regulator may be used so that exactly ½ or ⅓ of total available power is being used. In an embodiment where the maximum power required in one blade is less than the total available power, the surplus power may be routed to an "off" blade to pre-heat it before heating or to keep it warm after heating.

Referring now to FIG. 1B, shown therein is a block diagram of the ice protection system 101 of FIG. 1A, in accordance with an embodiment. The ice protection system 101 is configured to perform ice protection for a wind turbine blade 108. The ice protection system 101 is not shown to scale.

The tower 102 of FIG. 1 includes a basement. The basement is typically used to route ground-level cables, to anchor ground-level cabinets to a concrete pad, and to house some hydraulic components. The basement may include a basement disconnect panel. The basement disconnect panel may be mounted to a strut (which may be a custom strut).

In some embodiments, the wind turbine 100 power system may include a power line for providing power capacity to the ice protection system 101. The power line may be a high voltage cable. The power line may be routed from the basement through the tower 102 to the nacelle 104. The nacelle 104 includes a slipring which maintains electrical connection with hub 106 during rotation to transmit power to the hub 106.

In some embodiments, an upgrade to the power system may be made, particularly if the existing power system of the wind turbine 100 provides insufficient power to accommodate the ice protection system 101. The upgrade may include adding an additional power line and slipring connection to the existing components of the power system. In an embodiment, the additional power line may be run from the ground 150 to the hub 106 by winching the additional power line up through the interior of the tower 102. In another embodiment, the additional power line may be run from the basement to the hub 106 by winching the additional power line up an exterior surface of the tower 102 and then feeding the additional power line back down to the basement. This embodiment may be preferred as it may require less time to implement than the previously described embodiment. The additional power line and additional slipring connection may be used exclusively by the ice protection system 101.

The nacelle 104 may have a nacelle panel mounted within. The nacelle panel is a control panel that facilitates functionality of the ice protection system 101 based on the input from sensors 132. The nacelle 104 may communicate with the hub 106 via wireless communication.

The nacelle panel may be plugged into one of multiple manufacturer nacelle panels. The nacelle panel may pull 230V from the manufacturer nacelle panel cabinet. The nacelle panel may also pull turbine data from the manufacturer nacelle panel cabinet AA3 (e.g., data such as the turbine rotation speed, generated power, external wind speed, external wind temperature, etc.). A nacelle cabinet of the nacelle panel may also connect to a network of the wind-farm network via manufacturer nacelle panel. The system includes a server on-site, possibly at an operation and maintenance (O&M) building. The server may facilitate remote collection of data, pushing of software upgrades to the ice protection system, and allow a user to view and control how their systems are behaving. The server may be connected to the wind farm's local network (so that it can communicate with the wind turbines). The manufacturer nacelle panel cabinet may also be connected to this local network. Therefore, by connecting the nacelle panel of the ice protection system to the manufacturer nacelle panel cabinet, remote communication with the ice protection system can be facilitated.

Each blade 108 includes an interior and an exterior. The interior includes an interior cavity bounded by an interior surface. The exterior includes an exterior surface onto which ice may accumulate.

The interior includes blade bulkheads. The blade bulkheads may be located in the leading edge, the trailing edge, or both leading and trailing edges. The blade bulkheads may be thin foam walls coated in fiberglass and bonding-paste. The blade bulkheads are used for structural assistance during blade transportation and alignment during manufacturing. The presence of bulkheads may require drastic installation process changes (for example, using a bulkhead removal tool), and design changes to the ice protection system.

The blade portion of the ice protection system 101 (i.e., those components of the ice protection system 101 contained within the blade 108) may include a blower assembly 140 to move air throughout the blade 108, a heater assembly 120 to generate a heated airflow 160, a duct 110 for receiving the heated airflow 160 and for releasing the heated airflow 160 into the interior cavity of the blade 108, duct structural elements 116 to support and secure the duct 110 inside the blade 108, and a control system 130 with sensors 132 to control the heating system (e.g., heater 122 and blower 140). Each ice protection system 101 also includes electrical and mounting components.

The duct 110 may include a nozzle 114. The nozzle 114 pushes a jet of hot air (heated airflow 160) into a pressurized air pocket and generates force convection. The nozzle 114 located at the end of the duct 110 proximal to the tip of the blade 108 and is pointed towards the tip of the blade 108. The nozzle 114 may be pointed towards the leading edge (where icing is prevalent) or at some angle between the two.

The duct 110 may be a flexible duct. The flexible duct may be porous, perforated, meshed, permeable, impermeable, or nozzled. These features may be in clusters, a single row, or multiple rows, and direct heat towards the leading edge.

The blower assembly 142 includes a blower 140 to move air throughout the blade 108 and a blower bracket 144 to secure the blower assembly 142 to the blade 108.

During assembly of the blower, a blower sensor bracket may be attached to the blower assembly 142 to hold sensors 132. These sensors 132 collect various sensor information. The sensor information collected by the sensors 132 may include, for example, an air speed of the blower 140, a temperature of the air passing through the blower 140, or a pressure of the air exiting the blower 140. The sensors 132 may include an accelerometer in the blower sensor bracket of at least one of the blades 108. In an embodiment, the sensor bracket is a low profile addition to the inlet attached to the outside of a metallic mesh covering the blower inlet. In another embodiment, the sensors are attached directly to the blower outlet. The positioning of the sensors 132 with respect to the blower assembly 142 may vary depending on the model of wind turbine blade.

The heater assembly 120 includes a heater 122 to provide a heated airflow 160 and a heater bracket 124 to secure the heater assembly 120 to the blade 108.

The heater assembly 120 may be mounted to a surface in the interior cavity at or near the proximal end of the blade 108. The heater assembly 120 may be mounted distally relative to the blower assembly 142. The heater assembly 120 may be mounted to the blade 108 using similar methods and connectors to that of the blower assembly 142. The blower assembly 142 may be connected to the heater assembly 120 using any one or more of fabric, brackets, or a combination of fabric and brackets.

The heater 122 has a heater maximum output temperature. The heater maximum output temperature may be set to avoid softening the epoxy or resin of turbine components. This heater maximum output temperature may account for the temperature gradient between the heater 122 and the blade 108 components and therefor may be higher than the maximum allowable temperature of the duct components. The heater maximum output temperature may incorporate a factor of safety.

The heated airflow 160 is forced through the duct 110 by the blower 140 along the heated airflow 160 direction. The heated airflow 160 exits the duct 110 through the duct outlets 112. The heated airflow 160 may also exit the duct 110 through the nozzle 114. The duct outlets 112 and nozzle 114 may be positioned and designed to optimize the amount of the heated airflow 160 directed toward high ice concentration areas of the blade 108 to optimize the effect of the ice protection system 101 in ice protection the blade 108.

The ice protection system 101 includes a control system 130. The control system may monitor the environmental conditions inside and outside of the blade 108. This may include receiving sensor data from various sensors and analyzing the received sensor data. The control system may also control the operating condition of the heater 122 and blower 140.

The control system 130 includes a plurality of sensors 132. The sensors 132 may be coupled to the control system 130 using a sensor cable 134. In some cases, multiple sensors may use a single sensor cable. This may advantageously decrease the total number of cables in the blade 108 to reduce the chance of items wearing, and typically larger cables have more robust armor/insulation around them. Multiple sensors may send data down their respective manufacturer's cables, which may terminate in a junction box (typically the blade junction box) where that signal is passed into a different cable which extends towards a panel or programmable logic controller. The sensors 132 collect data about the conditions within, without, and of the wind turbine blades 108, and provide the collected sensor data to the control system 130 for analysis by a processing unit of the control system 130. The sensor cable 134 communicatively connects the sensor 132 to the control system 130. The sensor cable 134 enables data transmission from the sensor to the control system 130 for analysis.

The control system 130 may adjust the operating state and parameters of one or more of the heater 122 and blower 140, collectively referred to as the heating systems, based on an operating condition determined by the control system 130. The operating condition is determined based on an analysis of the sensor 132 data by the processing unit of the control system 130. The operating condition may also be determined using additional information, such as an operating level of the heating systems (e.g., a temperature of air, or power consumed by each heater 122). The control system 130 is further configured to generate a control signal based on the operating condition determination. The control signal encodes instructions which, when received by the heating system, can be used to adjust the operating state or an operating parameter of the heating system. The operating state of the heating systems may be off or on. The operating parameter may be one or more of blower 140 speed or heater 122 intensity. The control system 130 transmits the control signal to the heating system.

The sensors 132 may include any one or more of accelerometers, temperature sensors, air velocity sensors, air pressure sensors, current sensors, voltage sensors, and power quality sensors. Each blower assembly 142 may include a temperature sensor to measure the temperature of the air entering or leaving the blower 140. One or more blower assemblies 142 of the ice protection system 101 may include an accelerometer. The sensors 132 may include sensors configured to monitor a performance output of the wind turbine 100. The performance output sensor data can be analyzed by the control system 130 processing unit to determine if the wind turbine 100 at an expected level considering other known parameters.

The sensors 132 may include a temperature sensor for sensing an air temperature of interior of the wind turbine blade 108. The sensors 132 may include a temperature sensor for measuring the temperature of an internal surface of the wind turbine blade 108. The control system 130 may adjust an output of the heater 122 or the blower 140 based on an input provided by the temperature sensor(s) (e.g., temperature sensor data). The control system 130 may adjust an output of the heater 122 or blower 140 based on SCADA data. For example, the control system 130 may control the ice protection system 101 (e.g., an output of the heater 122 or blower 140) based on a rotations per minute (RPM) of the turbine 100 and measured wind speed.

The control system 130 may perform certain operations automatically. For example, the control system 130 may automatically calculate an expected payback for curtailing a turbine 100 to assist the ice protection system 101 using any one or more of historical "learned power curves" and weather forecasts, and machine learning. The control system 130 may combine data from the reported power output of the turbine 100, current weather conditions (e.g., wind speed, wind temperature, humidity), and ice sensors (e.g., fos4X, Eologix) to determine if the turbine 100 is currently iced or at a high risk of experiencing icing. If the turbine 100 is iced or at a high risk of icing, the ice protection system 101 may be turned on (e.g., by operation of the control system 130) without interrupting operation of the turbine 100. If the control system 130 still believes that the turbine 100 is iced, the control system 130 may calculate a potential payback of curtailing the turbine 100 to help the deicing procedure. This may only be beneficial if the icing event has passed and weather conditions are within the deicing range. To calculate the payback, the control system 130 may refer to a learned curve. The learned curve may be created for each specific turbine 100 and become more accurate with more data points. The learned curve may become more accurate by increasing the number of environmental factors and turbine parameters on which the curve is dependent, including but not limited to temperature, humidity, wind direction, turbine status codes, turbine RPM, and turbine blade pitch. If the turbine 100 is spinning fast, it may be very difficult to deice. Therefore, if the wind is very high and the turbine 100 is underproducing at a medium RPM level, and deicing can be performed at a lower RPM, it may be advantageous to reduce the RPM (therefore losing power production) during a short deicing period in order to return to a higher RPM (and produce more power at the deiced high RPM than we would have at the iced medium RPM level). The control system 130 automatically notifies a technician that the control system 130 has engaged the ice protection system 101. Then, before the control system 130 curtails the turbine 130, the control system 130 may request permission from the technician before proceeding (it would explain the projected power production without curtailment and the projected power production with curtailment).

The control system 130 may be configured to initiate (i.e., turn on) the ice protection system 101 when the control system 130 senses that the blade 108 is below a certain reference temperature or that a certain amount of ice has accumulated on the exterior of the blade 108. The control system 130 may be configured to initiate the ice protection system 101 when the control system 130 determines that the turbine 100 is producing less energy than expected based on a known wind speed or is producing too much energy which indicates that the anemometer is iced up and therefore reading unrealistically low wind speeds.

The above FIGS. 1A and 1B and discussion thereof refer to a control system 130 present at a wind turbine for controlling an ice protection system 101. It is advantageous for the control of ice protection systems from multiple wind turbines and possibly multiple windfarms (a geographic location with multiple wind turbines in close proximity which are configured to be on the same network) to be supervised from a single offsite location. The present disclosure describes systems and methods for controlling a plurality of wind turbines at a plurality of windfarms from a single location. The single location is referred to herein as the "ice protection control office", "control office", or "ICP office". The plurality of windfarms are referred to herein as "remote sites" or "remote wind turbine sites", as they are remote from the control office.

Although the below embodiments may refer to specific types of sensors it is to be understood that any type of sensor which can provide data relevant to ice protection for a wind turbine may be used.

The present disclosure describes ice protection system control systems which respond to data from sensors or other indicators at wind turbines to determine if ice protection measures, which can be implemented by the ice protection system, are required. The ice protection measures described herein refer to use of heating systems including heaters and blowers to protect the wind turbines from ice. However, it is to be understood that measures other than and in addition to heating may be used to protect a wind turbine from ice and that, in some embodiments, an ice protection system control system may initiate ice protection measures in response to data collected at the wind turbine. Other ice protection measures may include, but are not limited to, changing the pitch of the blades of the wind turbine, yawing the wind turbine away from a direction of the wind, and/or stopping the wind turbine.

In the embodiments described herein, a configuration in which each individual wind turbine sends data to be processed at an ice protection control office where any ice protection measures to be taken are then determined and controlled for each individual based on the respective data is most often discussed. However, in other embodiments, data may be received from a subset of a cluster of wind turbines and then ice protection measures determined for the subset are mapped onto and applied to the entire cluster. The cluster may be determined based on factors such as geographic proximity (geographic proximity data) or elevational similarities (elevation data). In other embodiments, each individual wind turbine may provide data to the ice protection control office, but the data may be pooled or averaged to determine appropriate ice protection measures for all of the wind turbines. In other embodiments, each individual wind turbine may provide data to the ice protection office and if a given threshold number of individual wind turbines report data which would necessitate ice protection measures, then all of the wind turbines will have ice protection measures initiated.

In some embodiments, the application of one ice protection measure at a given wind turbine may depend on different data than the application of another ice protection measure. For example, a determination of whether to turn a wind turbine away from the wind may be made based on data measured at each individual wind turbine. In contrast, a determination of whether to turn on a heating system of the wind turbine may depend on data which is averaged across multiple wind turbines.

It is to be understood that different types of wind turbines from different manufacturers, or wind turbines in different climates, geographic locations, topographically locations, etc., may require ice protection measure determinations based off of different data outputs. That is, ice protection measures may be required at different wind speeds, external or internal temperatures, external humidities, etc., for different wind turbines. As data is collected and analysed from different types of wind turbines (or the same type of wind turbine in different locations), the specific parameters of data which trigger ice protection measures in the different scenarios can be optimized. The precise time when ice protection measures should be initiated to minimize the net effect of ice on power generation (loss of power generation due to ice build-up vs. use of power due to ice protection measures) can be calculated.

Figure 2:
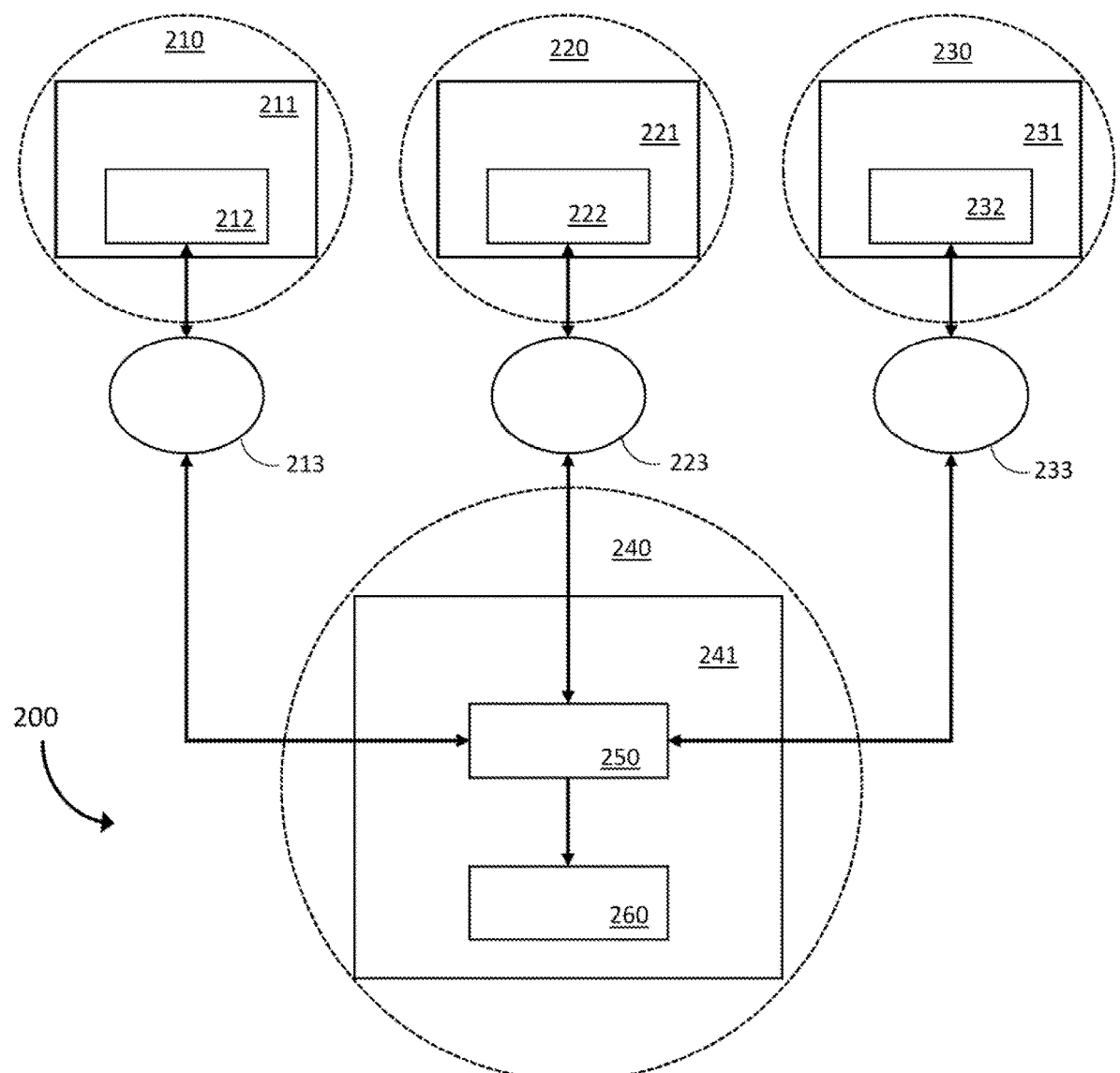
FIG. 2 is a block diagram of an ice protection control system for multiple remote wind turbine sites, in accordance with an embodiment.

Referring now to FIG. 2, illustrated therein is a block diagram of an ice protection control system 200, according to an embodiment. The ice protection control system 200 includes including an ice protection control office 240 and a plurality of remote wind turbine sites 210, 220, and 230.

FIG. 2 illustrates a high-level overview of networks and devices through which live data collected from sensors at remote site wind turbines is sent to a control office location to be analyzed to automatically determine if heating of any of the wind turbines is required for de-icing or anti-icing purposes, and if heating is required, to automatically turn on a heating system within an ice protection system of the wind turbine(s).

Each remote wind turbine site 210, 220, and 230 represents a different physical location where there is at least one wind turbine (such as wind turbine 100 of FIG. 1A).

Each remote site 210, 220, and 230 has a remote site network 211, 221, and 231, respectively. Remote site networks 211, 221, and 231 are used to run local operations at each wind turbine site 210, 220, and 230. Remote site networks may use public IP addresses.

At each remote site 210, 220, and 230 there is a site server 212, 222, and 232, respectively, within the respective remote site network 211, 221, and 231.

The site servers 212, 222, and 232 operate on local IP addresses but may not be on public IP addresses.

The site servers 212, 222, and 232 receive live data from wind turbines at the respective remote sites 210, 220, 230 and transfer that data to a control office retrieval server 250 at a control office network 240. In this embodiment, each of site servers 212, 222, and 232 transfer the live data to the same server (250) at one location 241. In other embodiments, the live data may be transferred to multiple servers and/or multiple locations.

In some embodiments, the "live data" is pseudo-live data. The pseudo-live data is created and collected from a recent time period (e.g., the previous ten minutes). The pseudo-live data is sent periodically (e.g., every ten minutes) from the remote site to the control office. In other embodiments, the data may be sent continuously.

The retrieval server 250 is on the control office network 240 at a location that is not the same as any of the remote sites. The control office network 240 may operate on a public IP address. The retrieval server 250 may be on a local IP address.

The live data may be transferred from the site servers 212, 222, and 232 to the retrieval server 250 through a VPN client 213, 223, and 233, respectively. The live data may be transferred from site server to VPN client through a TCP 22 port to ensure the privacy of the live data. The VPN client may be a commercially available VPN client. The VPN client used may depend on the specific network configurations and privacy concerns used at each remote site and the requirements therefrom. The live data may be transferred from the VPN client to the retrieval server through a TCP 443 port, a UDP 443 port, or any other appropriate port based on the specific network configurations and privacy concerns at each remote site.

After the live data is received at the retrieval server 250, the live data is transferred from the retrieval server 250 to a database server 260 to be analyzed. The live data and analyzed live data is stored in a location on the database server 260 which is specific to the wind turbine from which the data came. For example, the data may be linked to a unique wind turbine identifier identifying the wind turbine. The live data may be transferred from retrieval server 250 to database server 260 through a TCP 3306 port, or any other appropriate port based on the specific network configurations and the nature of the data.

The live data is analyzed at the control office network 240. Any action determined based on the live data is automatically taken by generating and sending instructions from the control office network 240 to the remote site 210, 220, or 230 through the VPN clients 213, 223, and 233 to site servers 212, 222, and 232, respectively.

Is it to be understood that this is a simplified embodiment of an ice protection control system network and, in other embodiments, more or fewer components may be included.

Figure 3A:
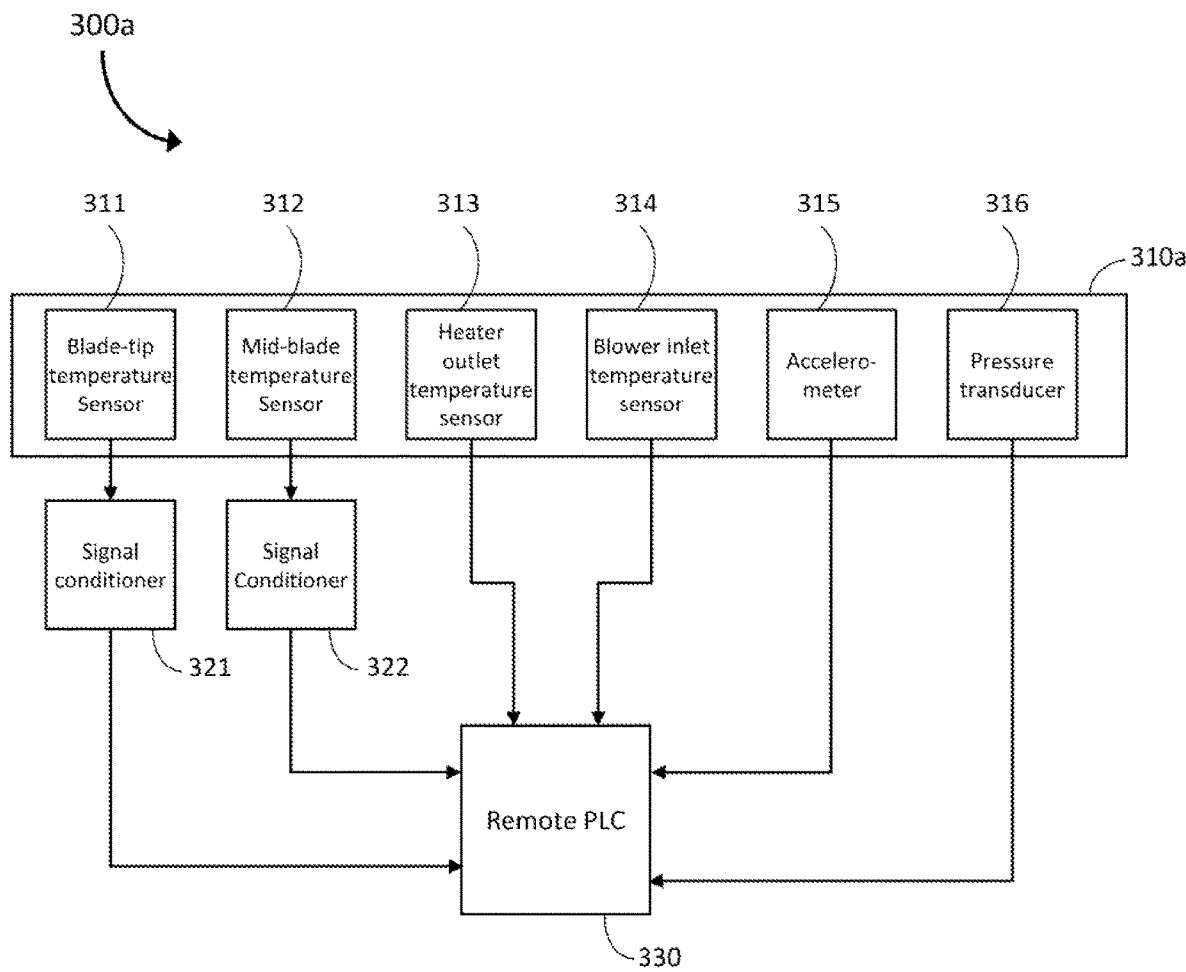
FIG. 3a is a block diagram of part of an ice protection control system for a wind turbine, in accordance with an embodiment.

Referring now to FIG. 3A, shown therein is a block diagram of part of an ice protection control system 300a for a wind turbine, in accordance with an embodiment.

Figure 3B:
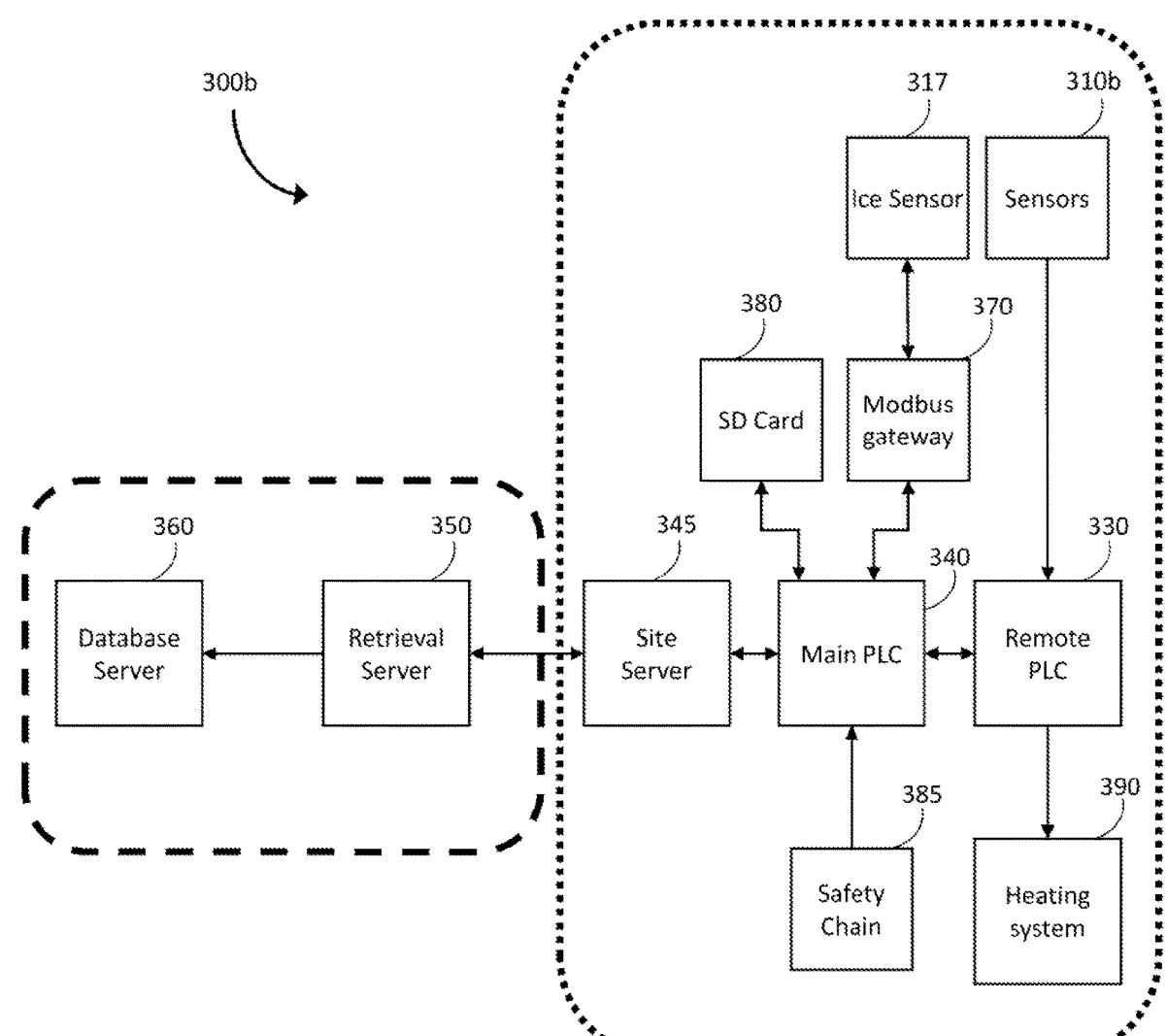
FIG. 3b is a block diagram of part of an ice protection control system for a wind turbine, in accordance with an embodiment.

Ice protection control system 300a represents only part of a control system for a single wind turbine, with the remainder of the control system illustrated in FIG. 3B.

The wind turbine includes a plurality of sensor types 310 which record data relevant to the anti-icing/de-icing system: blade-tip temperature sensor 311, mid-blade temperature sensor 312, heater outlet temperature sensor 313, blower inlet temperature sensor 314, accelerometer 315, and pressure transducer 316.

Sensors 310 send data to remote programmable logic controller (PLC) 330. The data from sensors 311 and 312 is sent to remote PLC 330 through signal conditioners 321 and 322, respectively.

The remote PLC 330 is a centralized data acquisition point for sensors 310 and feedback at the location of the remote PLC 330. In some embodiments, there may be a single remote PLC 330 for an entire wind turbine and the remote PLC 330 receives data from all of the hub sensors. In other embodiments, there may be a single remote PLC 330 present in each blade of a wind turbine and each remote PLC 330 may receive data from the set of blade sensors for the respective blade.

The path of the data from the remote PLC to the rest of the control system is shown in FIG. 3B.

FIG. 3B is a block diagram of an ice protection control system 300b for a wind turbine, in accordance with an embodiment.

Ice protection control system 300b represents a control system for a single wind turbine at a location remote from the control office. Components within the dashed line are located at the control office location. Components within the dotted line are located at a remote wind turbine site.

Sensors 310*b* are the same as sensors 310*a* from FIG. 3A.

Ice protection control system 300*b* further includes an ice sensor 317. Ice sensor 317 may be an ice detection sensor which is not integrated with the operations of the wind turbine (as sensors 310*b* are).

Data from sensors 310*b* passes through remote PLC 330 to a main PLC 340.

Data from ice sensor 317 passes directly through a modbus gateway 370 to main PLC 340.

In some embodiments the main PLC 340 is located within the nacelle. In other embodiments, the main PLC 340 may be at the wind turbine site but not within the wind turbine. In some embodiments the main PLC 340 may be within the hub of the wind turbine and the remote PLC 330 is in the nacelle. In some embodiments, the main PLC 340 may be in a blade of the wind turbine and the remote PLC 330 is in the nacelle. In some embodiments, there may only be one PLC in the hub (or elsewhere) that performs the functions of both the main PLC 340 and the remote PLC 330.

The remote PLC 330 acts as a "PLC coupler" where the remote PLC 330 receives voltage signals from the various sensors 310*b* and digitizes the signals to be sent to a main PLC (see below).

The remote PLC 330 also accepts digital signals from the main PLC 340 and converts the digital signals to voltage signals to control the flow of energy at the wind turbine.

The remote PLC 330 also traces communication protocols and performance between the main PLC 340 and the remote PLC 330.

Signals may be sent between the remote PLC 330 and the main PLC 340 via ethernet or Bluetooth™.

Minimal logic or data manipulation may be executed or performed at the remote PLC 330. The signal from the remote PLC 330 may be filtered and smoothed. For filtering, an example may be that a 0-5V signal may be digitized by the remote PLC 330 as "LOW", 15-24V may be "HIGH", and anything higher digitized as "UNSTABLE". The signal may be smoothed such that there is a moving average every 0.03 seconds for voltage and current signals to reduce signal volatility.

The main PLC 340 is connected to an SD card 380 which is used as a storage medium for logging data locally at the wind turbine site (inside the wind turbine if that is where the main PLC 340 is located). The SD card 380 may be used for saving initialization, configuration, and access data that the main PLC 340 uses or generates. In other embodiments, any memory or other data storage medium may be used and any appropriate storage format may be used (i.e., SD card 380 uses CSV files but other storage media may use other formats, e.g., relational or non-relational databases).

The main PLC 340 may also be connected to a safety chain 385 configured to shut down the ice protection system when it is unsafe for operation to occur. For example, the safety chain 385 may respond to an emergency stop signal generated when a worker hits an emergency stop button for the wind turbine. Any and all additional safety-related measures for the wind turbine may be part of the "safety chain" 385 and connected to the main PLC 340 therefrom.

The data from the sensors is sent from the main PLC 340 to a site server 345 (similar to site servers 212, 222, and 232 of FIG. 2). Site server 345 is located at the same physical site as the wind turbines. Site server 345 may be located at an operation and maintenance building at the wind turbine site or a similar location (e.g., a SCADA room, server-room, substation, etc.) at the wind turbine site. The site server 345 communicates directly with the main PLC 340.

The data from the sensors is then pulled from the site server 345 by a retrieval server 350 at the control office. The data is then stored on a database server 360 at the control office. Data transfer from retrieval server 350 to database server 360 may be various internal connections (not via ethernet). In other embodiments, there may be only one server at the control office which both pulls back data from the site servers and stores the data or there may be more than two servers performing the various functions.

The database server 360 may store the data as SQL data in a database, for example a MySQL database. The database server may store the data in a non-relational database.

The data is analyzed at the control office. If, based on the analysis, it is determined that action is required, control instructions are generated and sent back through the network to adjust a parameter (e.g., turn on or off) of a heating system 390 at the wind turbine. Such control instructions, when received by the control system, may cause the controller to adjust the parameter of the heating system 390 (such as through generating and sending control signals from the controller to the heating system 390).

In other embodiments, there may be multiple retrieval servers which perform similar or different functions.

Communication between the various components of the control system network may be through various ethernet protocols, including, but not limited to, FTP ethernet, FINS ethernet, Modbus (RTU) ethernet, FINS/TCP ethernet, FINS 4 wire ethernet, Modbus/TCP ethernet, and SOAP API ethernet, or through various non-ethernet communication protocols, including, but not limited to, Bluetooth™, Wi-fi, satellite, radio frequency transmitters, fibre optics, serial communication, DSL, or wireless broadband. Communication could also include open platform communications (OPC) in various forms (e.g., OPC XML, OPC UA).

It is to be understood that this is a simplified version of the control network and that other components such as ethernet switches and wireless converters may be required.

In some embodiments, there are multiple remote PLCs for each wind turbine, while in other embodiments there is a single remote PLC for each wind turbine.

In some embodiments there is a single main PLC for each wind turbine, while in other embodiment each main PLC controls multiple wind turbines.

In some embodiments at least one control device other than a PLC may be used, for example, a microcontroller, an industrial PC, a remote telemetry unit, a programmable automation controller, an embedded controller, an ethernet I/O module, and/or a smart relay.

In some embodiments, data is collected from each blade of a wind turbine and the heating system of each blade is controlled in response to the data from that respective blade. In some embodiments, data is collected from only one blade and the heating systems of all blades of the wind turbine are controlled in response to the data from the one blade. In some embodiments, data is collected from all blades and the heating systems of all blades of the wind turbine are controlled in response to data from any single blade.

In some embodiments, data is collected from each wind turbine at a single location (e.g., a single windfarm, a single specified geographic area, etc.) and the heating systems within each wind turbine are controlled in response to the data from the respective wind turbine. In some embodiments, data is collected from each wind turbine and the heating systems of all of the wind turbines are controlled in response to data from at least one wind turbine (e.g., any single wind turbine returns a flag that there may be ice and all of the nearby wind turbine heating systems are turned on or at least a certain percentage of wind turbines returns a flag and all of the nearby heating systems are turned on). In some embodiments, data is only collected from a representative sample of a group of wind turbines (may be a single representative wind turbine or multiple) and the data from the representative wind turbines is used to determine what the state of the heating systems of the entire group of wind turbines should be.

Figure 4:
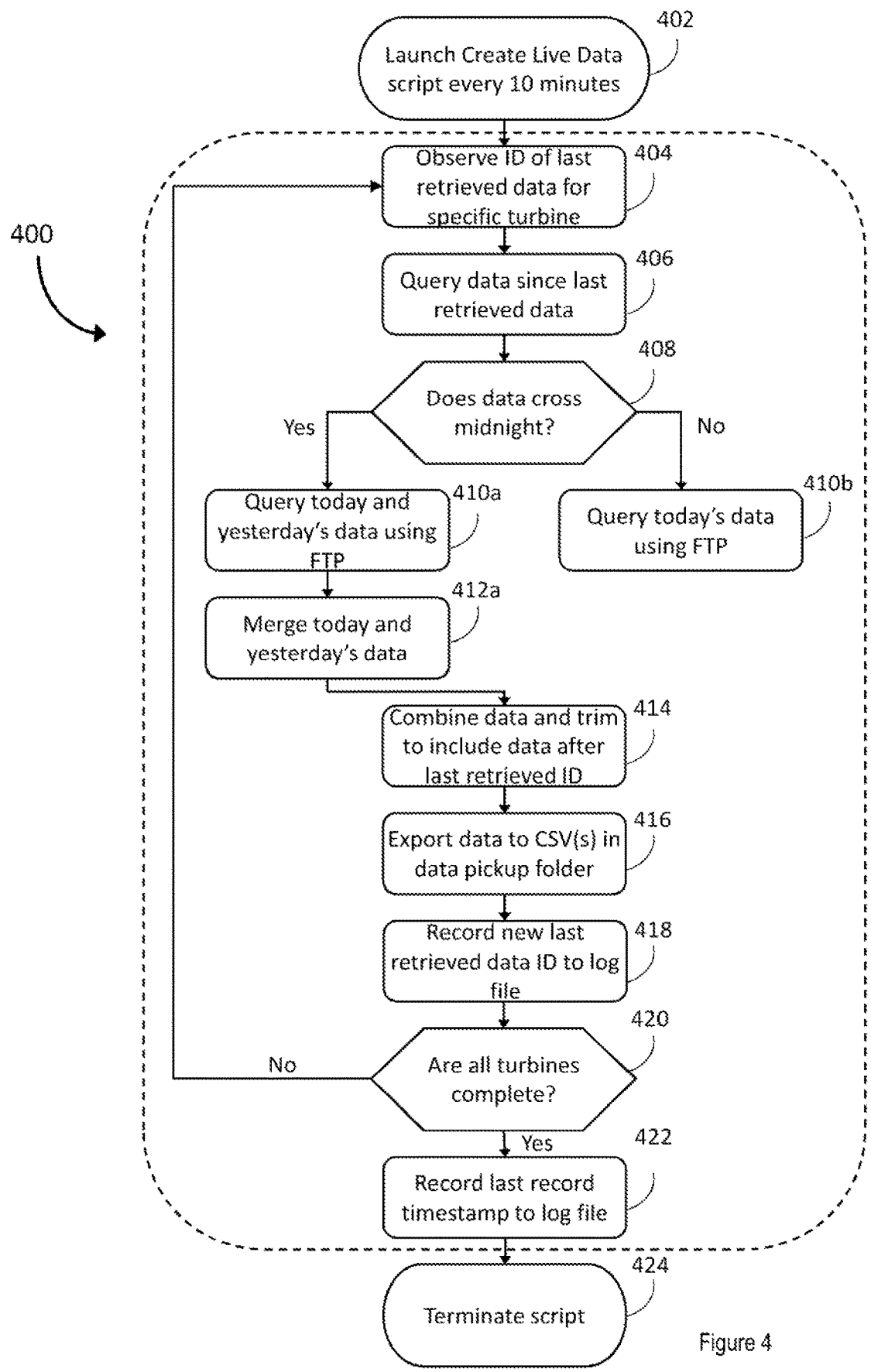
FIG. 4 is block diagram of a method of creating live data at a remote wind turbine site, in accordance with an embodiment.

Referring now to FIG. 4, shown therein is block diagram of a method 400 of creating live data at a remote wind turbine site, in accordance with an embodiment.

Creating live data occurs at a remote site network (e.g., remote site networks 211, 221, and 231 of FIG. 2) of a remote location.

A script is launched from a site server (e.g., site servers 212, 222, and 232 of FIG. 2) to gather, combine, and prepare the data to be retrieved from wind turbines at the remote location. The script may gather data from all wind turbines at the remote site or from a subset of the wind turbines at the remote site.

"Live data" refers to a specific configuration of data which has been collected and processed from basic data measured at the various relevant sensors of the wind turbine. These sensors may include current sensors, voltage sensors, power quality sensors, accelerometers, temperature sensors, air velocity sensors, air pressure sensors, and other digital inputs.

At 402, the Create Live Data script is launched every ten minutes from a site server on a remote site network. In other embodiments, the script may be launched at any other suitable amount of time. Steps 404-422 describe the steps of the script (inside dashed bubble).

At 404, the identification (ID) of the last retrieved data for a specific wind turbine is observed in a log. If the process is functioning correctly, the last retrieved data should be from ten minutes prior. If something has gone wrong, the last retrieved data may be from an earlier timepoint.

At 406, the data since the last retrieved data is queried. That is, any data which was measured at the various relevant sensors of the wind turbine since the time the last live data was retrieved is queried.

At 408, the script checks whether the queried data is from a time period that crosses midnight.

At 410*a*, if the time period does cross midnight, the data from both dates (i.e., yesterday and today) is queried using a file transfer protocol (FTP).

At 412*a*, the data from both dates is merged.

At 410*b*, if the time period does not cross midnight, the data is queried using a file transfer protocol.

At 414, the queried data from the various sensors and sources within a single wind turbine are combined and trimmed to include data since the last retrieval. For example, in some embodiments, data may be queried every ten minutes. An ID number may be recorded for the data which was used in the most recent retrieval. When a new retrieval begins data (ten minutes after the last), all data since the last retrieval is collected. If an error has occurred and the interval between queries is greater than ten minutes, e.g., two hours, then the ID number will show that a query has not occurred for some time and all of the intervening data will be queried. The extended data would be trimmed down into ten minute intervals and each ten minutes would be processed individually.

At 416, the data is exported as comma separated values (CSV) to a data pickup folder on the site server.

At 418, a new ID for the last retrieved data is recorded to a log file.

At 420, the script checks that data has been created and exported for all expected wind turbines (may not be every wind turbine at the remote location but rather a subset). If all expected wind turbines have not been completed, the script starts over at step 404.

At 422, a last record timestamp is recorded to the log file.

At 424, the script is terminated. The entire method will start again ten minutes after the previous live data creation started.

Referring now to FIG. 5, shown therein is a block diagram of a method 500 of retrieving live data from a remote wind turbine site, in accordance with an embodiment.

Retrieving live data occurs at a remote site network (e.g., remote site networks 211, 221, and 231 of FIG. 2) of a remote location and at a control office network (e.g., control office network 240 of FIG. 2) at a control office.

A script is launched from a retrieval server (e.g., retrieval server 250 of FIG. 2) to retrieve the previously collected and processed live data from a site server (e.g., site servers 212, 222, and 232 of FIG. 2) at the remote location. The script may retrieve data regarding all wind turbines at the remote site or from a subset of the wind turbines at the remote site.

At 502, the Live Data Retrieval script is launched every ten minutes from a retrieval server on a control office network. In other embodiments the script may be launched at any other suitable amount of time. Steps 504-512 describe the steps of the script (inside dashed bubble).

At 504, a VPN connection is opened with a remote site site server using a site specific batch script.

At 506, the live data is retrieved from the site server via secure file transfer protocol (SFTP). The live data is sent from the site server at the remote location to a retrieval server at the control office location.

At 508, the live data is stored locally on the retrieval server and removed from the site server.

At 510, the VPN connection is closed. If the VPN connection is not closed after every live data retrieval then subsequent live data retrieval may not be possible until the previously opened VPN connection has been closed properly.

At 512, the script checks if live data retrieval from all sites is complete. The control office may be collecting data from multiple remote locations (i.e., multiple windfarms which each have their own remote network). If live data retrieval from one or more of the remote locations is not complete, the method will return to step 504 and repeat until all locations are complete.

At 514, if live data retrieval from all of the sites is complete, the script is terminated.

Referring now to FIG. 6, shown therein is a block diagram of a method 600 of importing live data from a remote wind turbine site to a database, in accordance with an embodiment.

Importing live data to the database occurs on a control office network (e.g., control office network 240 of FIG. 2) at a control office.

A script is launched from a retrieval server (e.g., retrieval server 250 of FIG. 2) to send the previously retrieved live data from the retrieval server to a database server. In the embodiment of FIG. 6, the database is a MySQL (structure query language) database. In other embodiments, a different database service or other configurations for storing data may be used.

At 602, a Live Data Import to Database script is launched from the retrieval server at the control office every ten minutes. In other embodiments the script may be launched at any other suitable amount of time. Steps 604-614 describe the steps of the script (inside dashed bubble).

At 604, a SQL database engine (software which recognizes and interprets SQL commands) is connected to a MySQL database on the database server at the control office.

At 606, CSV (comma separated value) files (see Method 400 step 416) are loaded onto the database server. The CSV files for each remote location are loaded from a site-specific location on the retrieval server.

At 608, the CSV files from each specific site are parsed to the specific wind turbine at the specific site.

At 610, the CSV for each wind turbine is stored to a specific table in the database on the database server. In this embodiment, the CSV for each wind turbine is stored in a MySQL table specific to each wind turbine.

At 612, the script checks if parsing and storing of the CSVs for each wind turbine at a specific remote site is complete. If all wind turbines are not complete, the script returns to 608 until all data is parsed and stored.

At 614, the script checks if all loading, parsing, and storing of the CSVs for each remote site is complete. If all remote sites are not complete, the script returns to 604 until all data is properly stored.

At 616, the script terminates.

Methods 400, 500, and 600 may operate in concert to create, retrieve, and store data from wind turbines from remote sites. The timing between execution of each method may be set to acceptable limits to allow enough time for each method to complete before the next method. That is, for example, that there is enough time between expected termination of method 400 and launch of method 500 that retrieval of live data for method 500 occurs for live data which was created less than 10 minutes ago. For example, method 400 may occur every ten minutes on 0s (e.g., 12:00, 12:10, 12:20, etc.) while method 500 occurs every ten minutes on 3s (e.g., 12:03, 12:13, 12:23, etc.), and method 600 occurs every ten minutes on 6s (e.g., 12:06, 12:16, 12:26, etc.). In other embodiments, the timing between execution of each method may not be timed to allow them to occur in sequence every ten minutes. That is, for example, method 500 may retrieve data from the last available live data creation regardless of when it occurred. For example, all methods may occur every ten minutes on 0s (e.g., 12:00, 12:10, 12:20, etc.) and the execution of method 500 at 12:10 may retrieve live data created by method 400 at 12:00.

In other embodiments, the interval of time between execution of each script may be different for each method. For example, live data creation may occur every ten minutes, but retrieval may be every 20 minutes, and storage every hour.

It is to be understood that methods 400, 500, and 600 of FIGS. 4, 5, and 6 are not the only processes which occur in order to create and retrieve live data from wind turbines at remote sites and to store the live data at a control office. For example, there may be scripts which run to establish connection through VPNs or scripts to build site-specific configurations required for data retrieval and to execute pulling back data from a remote site based on the site-specific configurations.

The above description describes how data is created, moved, processed, and stored within the system of the remote networks and control office network. Illustrated in FIGS. 7 and 8 are methods for reading and acting on the data.

Figure 7:
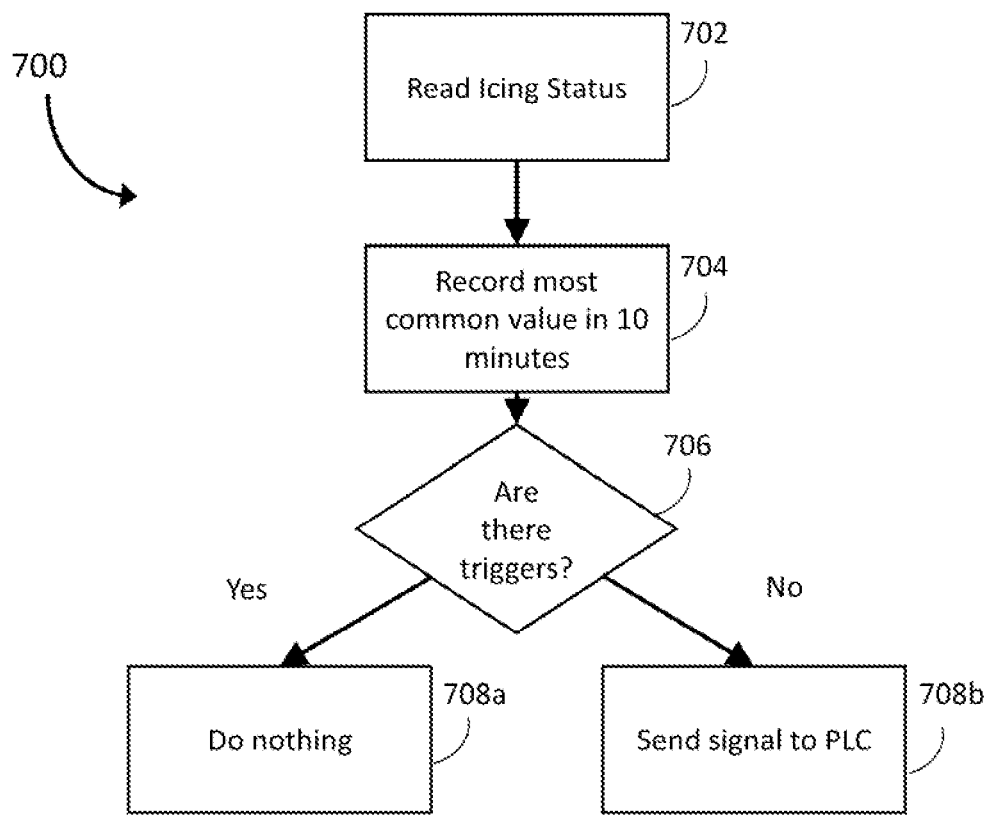
FIG. 7 is a block diagram of a method of an automatic control logic for reading live data from a remote wind turbine site, in accordance with an embodiment.
Figure 8:
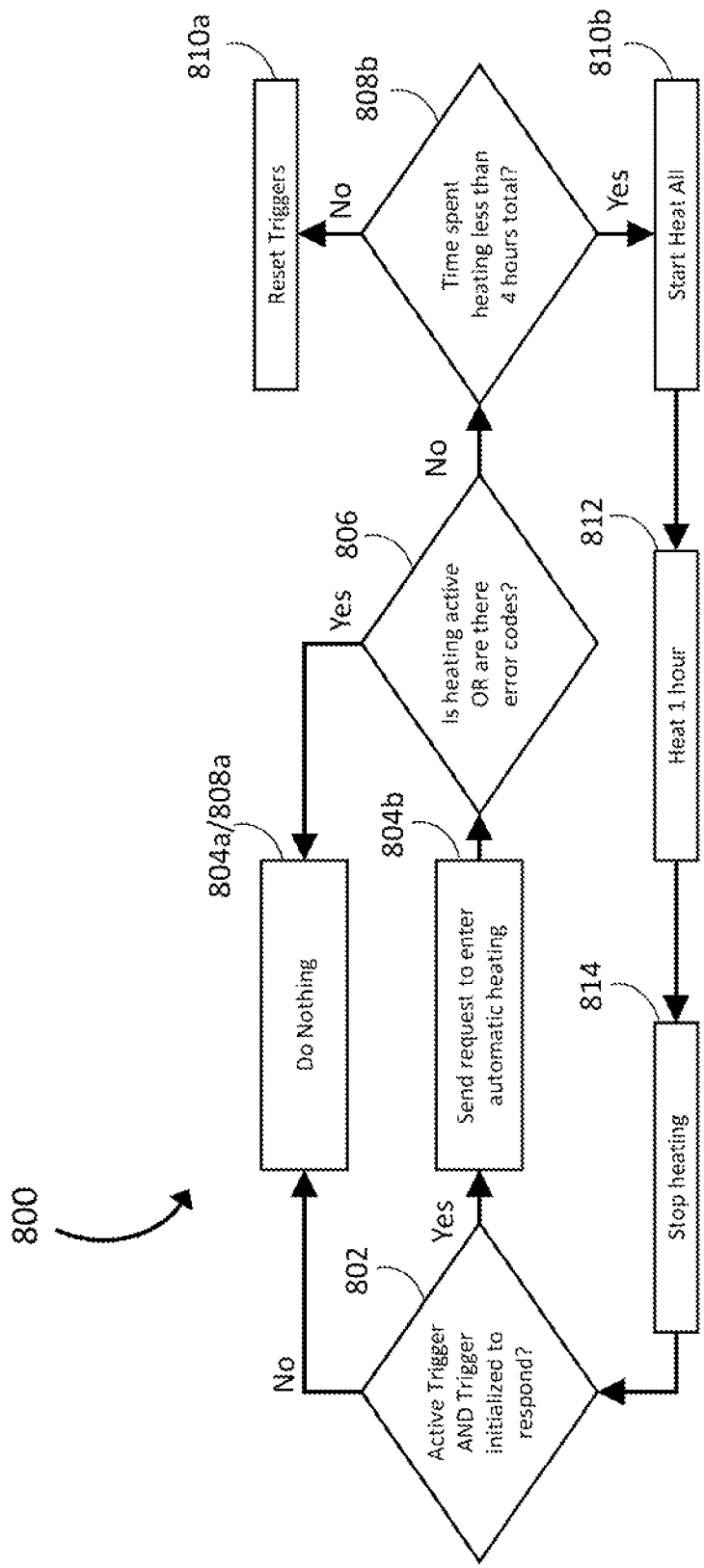
FIG. 8 is a block diagram of a method 800 of the response of a programmable logic controller (PLC) in an automatic control logic system to triggers from a remote wind turbine site, in accordance with an embodiment.

Referring now to FIG. 7, shown therein is a block diagram of a method 700 of an automatic control logic system for reading live data from a remote wind turbine site, in accordance with an embodiment.

Method 700 is often discussed with reference to a single wind turbine, but it is to be understood that method 700 may be performed for multiple wind turbines at multiple remote sites.

It is also to be understood that the heating systems within the ice protection systems of multiple wind turbines may be controlled in response to data from a subset of those multiple wind turbines.

The automatic control logic system responds to system triggers which represent inputs from the various sensors at a remote site wind turbine. The triggers are sent as live data to a control office network (Methods 400, 500, and 600). The control office network reads the data and automatically takes any necessary action to control heating systems at the remote site.

At 702, an icing status ("IcingStatus") of a wind turbine is read at a control office server. The control office server may be the same server as a retrieval server or a database server discussed above or may be a separate server.

The live data which has been created, retrieved, and stored for remote site wind turbines includes error code data. The error code data represents operational codes from the wind turbine. These may include, but are not limited to, various windspeed, torque, stoppage, and temperature parameters which are measured by sensors on the wind turbine. Certain error codes are identified as icing-specific codes which result in the ice protection system setting a value of the error code to an IcingStatus internal tag when they are active.

At 704, the most common value of the IcingStatus over the most recent ten minutes of data (e.g., most recent live data which has been is created, retrieved, and stored) is recorded by the control office server.

The icing-specific error codes may be read at the wind turbine every second. The control office server checks every ten minutes if there were more icing-specific error codes with IcingStatus than icing-specific error codes without IcingStatus. If there are more IcingStatus error codes than non-IcingStatus error codes then the most common value is IcingStatus.

At 706, the automatic control logic checks if there are triggers active.

If the most common value is IcingStatus, then a trigger is active. In other embodiments, there may be certain error codes or combinations of error codes that, when active, automatically cause the trigger to be set to active.

Triggers beyond the operational error codes of the wind turbine may also be present. For example, there may be a power curve trigger which becomes active when the power curve has degraded. A filter may be applied to the power curve trigger such that the power curve trigger can only be active when the power curve has degraded and the ambient temperature is below a certain value (e.g., a temperature at which ice may occur). Another example may be an ice detection sensor at the wind turbine which detects ice based on a number of parameters including temperature, wind speed, and liquid water content of the air or which detects ice based on the blade mass which would increase if there is ice present on the blade.

At 708*a*, if there are no active triggers, no action is taken.

At 708*b*, if there are active triggers, a signal is generated and sent from the control office server to a PLC (e.g., main PLC 340 of FIG. 3*b*).

If any trigger is active (e.g., IcingStatus trigger, power curve degradation trigger, ice detection sensor trigger), then a signal is sent to the PLC to adjust an operating parameter of (e.g., turn on) the heating system of at least the wind turbine from which the error codes were received. In other embodiments, more than one trigger or a specific combination of triggers may be required for a signal to adjust the operating parameter to be sent to the PLC.

Referring now to FIG. 8, shown therein is a block diagram of a method 800 of the response of a programmable logic controller (PLC) in an automatic control logic system to triggers from a remote wind turbine site, in accordance with an embodiment.

Method 800 is discussed with reference to a single wind turbine, but it is to be understood that method 800 occurs for multiple wind turbines at multiple remote sites.

It is also to be understood that the heating systems within the ice protection systems of multiple wind turbines may be controlled in response to data from a subset of those multiple wind turbines.

At 802, the PLC checks for any active triggers sent as a signal from a control office server, as described above in method 800 of FIG. 8.

If there is an active trigger, the PLC checks if the specific trigger is initialized. That is the PLC may only be initialized to respond to certain triggers for certain remote sites or certain wind turbines within a remote site. The PLC may be configured to always ignore specific triggers or to ignore specific triggers under certain conditions. For example, the PLC may be configured to ignore a first trigger unless a second trigger is also active.

At 804a, if there are no active triggers, or there is an active trigger or combination of active triggers which the PLC is not initialized to respond to, the PLC takes no action.

At 804b, if there is an active trigger or triggers and the PLC is initialized to respond, the PLC generates and sends a request to the ice protection system of at least one wind turbine to enter automatic heating.

At 806, the PLC checks if the heating system is already active at the wind turbine or if there are error codes.

At 808a, if heating was found to be active or there were error codes, the PLC takes no action.

At 808b, if heating was not found to be active and there are no error codes, the PLC requests to launch a "Heat All" cycle.

A Heat All cycle turns on the heating system in the wind turbine for a first predetermined period of time (e.g., one hour). In other embodiments, the Heat All cycle may be any other amount of time.

Before the Heat All cycle can be launched, the PLC checks if the heating system of the wind turbine has been run recently for less than a second predetermined period of time (e.g., four hours total). An acceptable time frame (other than four hours) in which four cycles of the heating system have been run may be set (e.g., four cycles in five hours or greater is fine but four cycles in less than four hours and fifteen minutes is not).

At 810a, if the total recent time spent heating is greater than the second predetermined period of time (e.g., four hours), the PLC resets the triggers to prevent unnecessary heating in the event that the triggers have not been updating properly.

At 810b, if the total recent time spent heating is not greater than the second predetermined period of time (e.g., four hours), a Heat All cycle is launched for the heating system of the wind turbine.

At 812, the heating system is run for the first predetermined period of time (e.g., 1 hour).

At 814, the heating system is turned off.

After 814 the method begins again at 802 and repeats until the total recent time spent heating has been greater than a third predetermined period of time (e.g., corresponding to a predetermined number of heat all cycles, such as four hours corresponding to four one-hour Heat All cycles) and then the triggers are reset. If a new signal is sent to the PLC from the site server, the method begins again at 802.

In method 800, reference is made to stopping and starting the heating systems of blades of wind turbines in cycles. In other embodiments, the decision to continue using the heating system may occur during a "cycle" and not at the end of a cycle. That is, the configuration of the PLC logic system and the heating system may enable the heating system to be run continuously until no longer required instead of stopping and starting at hour or other periodic intervals in response to periodic checks.

In other embodiments, the impact of the heating system (or other ice protection measures) on various parameters, such as ice build-up or the power curve, may be monitored while the measures are active or have been enacted to determine if further ice protection measures are required. For example, if the heating system is not having an expected impact then the wind turbine may be stopped and only turned back on once an expected result (e.g., complete de-icing as determined by sensors such as an ice detection sensor) has been achieved.

Figure 9:
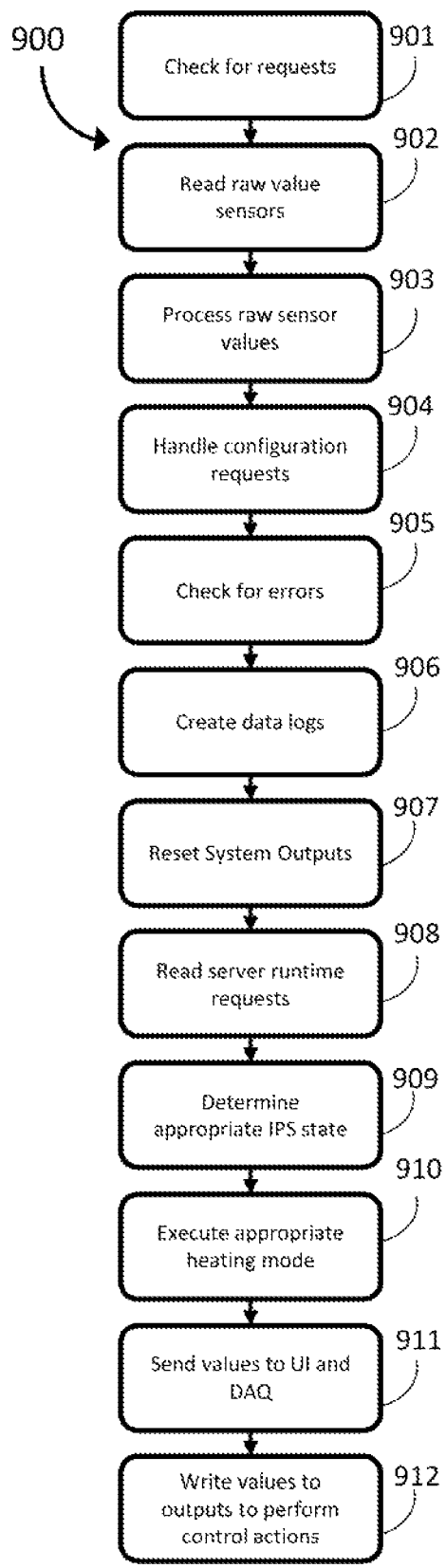
FIG. 9 is a block diagram of a high-level method 900 of processing inputs to an ice protection control system, in accordance with an embodiment.

Referring now to FIG. 9, shown therein is a block diagram of a high-level method 900 of processing inputs to an ice protection control system, in accordance with an embodiment.

Specifically, method 900 describes the processing of inputs within a logic flow program of a programmable logic controller (PLC) and the output of the system.

Each step of method 900 is a high-level step. The control system for method 900 includes a main PLC and a remote PLC. As above, in various embodiments the PLCs may be in different locations within the wind turbine or even outside of the wind turbine, the PLCs may be other forms of controller, and there may be a single PLC or more than two PLCs.

At 901, the main PLC checks for requests from all wind turbines at the site. The requests may be given by a site server on-site.

At 902, the remote PLC reads raw sensors values. In other embodiments, the raw sensor values may be read by the main PLC or by both the remote PLC and the main PLC. Other forms of data may also be received from the wind turbine by the PLC at this stage.

At 903, the raw sensor values are processed. Processing includes converting the raw sensor values into appropriate units. As mentioned above, the remote PLC may convert voltage signals into digital signals to send to the main PLC.

The values are then filtered by evaluating known states and marking unknown states (e.g., if there is no communication to a blade than all sensors for that blade would be marked as unknown).

At 904, the control system responds to configuration requests if the system is found to be in a state where configuration is needed or ongoing.

At 905, a check is performed for system errors.

Sensor health is evaluated by comparing actual values to expected minimum and/or maximum thresholds, comparing values to other similar sensors (e.g., within a turbine, between turbines, etc.), comparing values between sensor systems (e.g., comparing Ambient temperature at a wind turbine to temperature at a weather station at the wind turbine site), and comparing sensor values to known operational system modelling (e.g., the heater has been on for a certain amount of time so the temperature should have increased by a certain number of degrees).

Errors are also set for sensors based on findings of which sensors are non-functional or show poor health. The errors may be categorized by severity.

Safety-related error signals are evaluated. If a signal is lost for safety-related sensors of if a safety-related sensor shows an error, then the ice protection system is put into a safe-state until the issue is resolved. There may be different levels of safe-state, e.g., limiting rotation speed or stopping the wind turbine completely.

An overall check that enough critical sensors are operational is performed to ensure that the ice protection system can function properly and safely. Not all sensors are critical, but the ice protection system may be configured to not run if there are not enough critical trusted sensors functioning to create actionable readings for reference for the control system.

Error flags may be set based on the findings of the performance of the sensors as described above.

At 906, data logs are created for the observed values.

These values may include raw sensor data, processed sensor data, error states, error flags, and/or any other data of importance to the functioning of the ice protection system.

The values may be logged at regular intervals and the intervals may change according to the current state of the ice protection system. For example, while the heating is on, the values may be logged for frequently than when the heating is off. As another example, when there is an error, the values may be logged more frequently until the error has been resolved.

Additionally, the type of data logged may depend on the current state of the system. That is, when there are errors, more types of data may be logged than when there are no errors. In some embodiments, the data log is stored on site at the main PLC or site server, while in other embodiments the data log may be stored both onsite and at an off-site location on a retrieval server or a database server.

At 907, if critical or high-impact errors exist the system, outputs are reset and the ice protection system is placed in a safe state.

At 908, a check is performed for any runtime requests from devices other than the main PLC. Inputs from the non-main PLC devices are read which may show that ice conditions are occurring or imminent.

These inputs may come from the site server, ice sensors, SCADA, etc.

The inputs are filtered to determine if and which response from the ice protection system is required. For example, if ice is not yet present but may occur soon then the ice protection system may enter an anti-icing mode, while if ice is present the ice protection system may enter a de-icing mode.

Alternatively, if only one source of input is signaling that ice is occurring or imminent, but others are not, the input may be ignored (depending on the input source).

A check is also performed to determine if a user has requested a specific ice protection system mode or if a direct request for a specific mode has come from other devices such as the site server, SCADA, or other external devices. The requests may be filtered to ensure that they are current, i.e., still relevant, requests. Requests may need to be confirmed by a second request.

At 909, it is determined which state the ice protection system should enter based on the available information and a pre-determined priority scheme.

For example, in one embodiment, at a first stage (i) if an error or other request to stop is made, then the IPS is stopped and kept inoperable until the error/other issue is resolved. If at (i) there is no error or request for stopping, then the scheme carries on to a second stage (ii). At (ii), if a heating mode is currently active, new requests are not carried out until the current heating mode is finished or is cancelled, although a high priority request may override and cancel current heating modes. If a heating mode is not active the scheme carries on to a third stage (iii). At (iii), any manual requests which have been made are processed. If there are no manual requests, the scheme carries on to a fourth stage (iv). At (iv), if an automated request has been made, then the IPS goes into the heating mode which fulfills the automated request.

At 910, the chosen heating mode is executed.

Heating modes include where the ice protection system is off and certain data or requests may turn off all ice protection system outputs.

While an active (non-"off") heating mode is active, sensor values are continually monitored to ensure that the system is running correctly. This may include, for example, that one blade is not becoming hotter than the others, that a predicted result is being achieved (i.e., heating is occurring at the correct rate), or that maximum temperatures are not being exceeded. If the correct result is not being achieved, and operating parameter of one or more components of the ice protection system may be altered (e.g., blower power may be varied). Heating power is managed to ensure that total power drawn does not exceed limitations of the electrical system. Heating power is monitored to ensure that power is dynamically allocated for even distribution of heat among blades.

Each heating mode may include various steps through which the system progresses. The system may progress through more than one heating mode. Heating modes may include heating a single blades, two blades, or all three blades. The number of blades currently heating may vary depending on environmental or other factors. The various components involved in implementing a heating mode may have a staggered startup. For example, certain components used in a heating mode may start before others in order to manage current draw (e.g., blower starts before heater).

During heating, there may be timers or feedback mechanisms (e.g., monitoring de-icing) which determine the amount of heating power applied at each blade.

When a heating mode is ending, there may be a cooldown period during which the blower(s) is active while the heater(s) is inactive.

Runtime of a heating mode is monitored and managed to not overheat any areas of the blade past safe limits.

Thresholds, such as maximum heater temperature and power, may be adjusted as necessary based on runtime, environmental factors, and other monitoring.

At 911, values are sent to a user interface system. In some embodiments, values may be sent to other systems.

At 912, values related to the current or most recent heating state are written as outputs in order to trigger and perform control actions as determined by the main PLC and any error states.

Figure 10A:
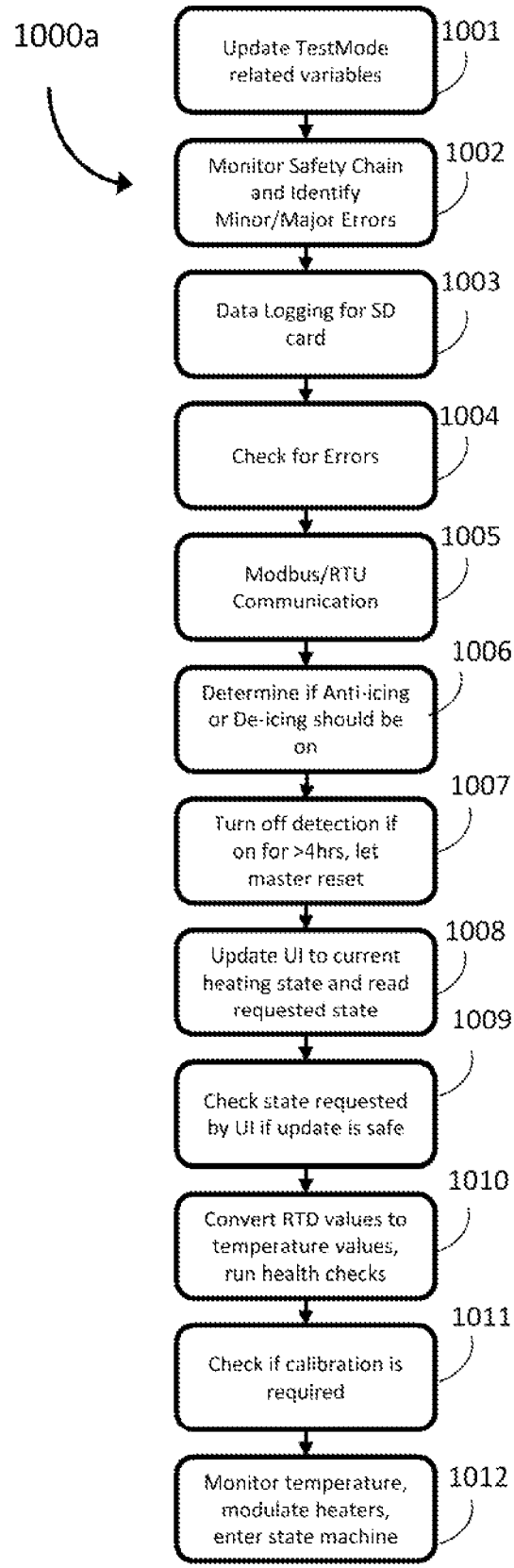
FIG. 10a is a block diagram of a detailed high-level method of processing inputs to an ice protection control system for a remote wind turbine site, in accordance with an embodiment.

Referring now to FIG. 10A, shown therein is a block diagram of an exemplary high-level method 1000a of processing inputs to an ice protection control system for a remote wind turbine site, in accordance with an embodiment.

Method 1000a describes the processing of inputs within a logic flow program of a programmable logic controller (PLC).

Each step of method 1000a is a high-level step. Method 1000a includes more exemplary detail than method 900, but is similar. Each of steps 1001-1012 includes substeps which are described in FIGS. 10B-10M below.

Figure 10B:
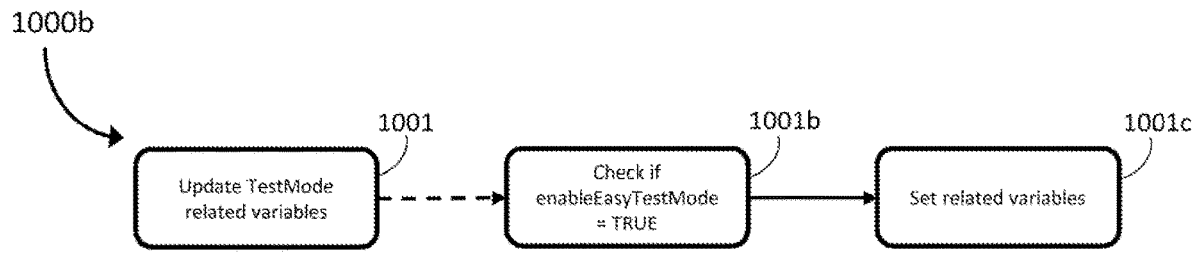

FIG. 10B is a block diagram of exemplary sub-steps of method of Figure specifically the sub-steps of step 1001.

At 1001, the PLC updates TestMode related variables.

Step 1001 comprises substeps 1001b and 1001c.

At 1001b, the PLC checks if enable EasyTestMode is true.

At 1001c, if EasyTestMode was true, the PLC sets the related variables.

Figure 10C:
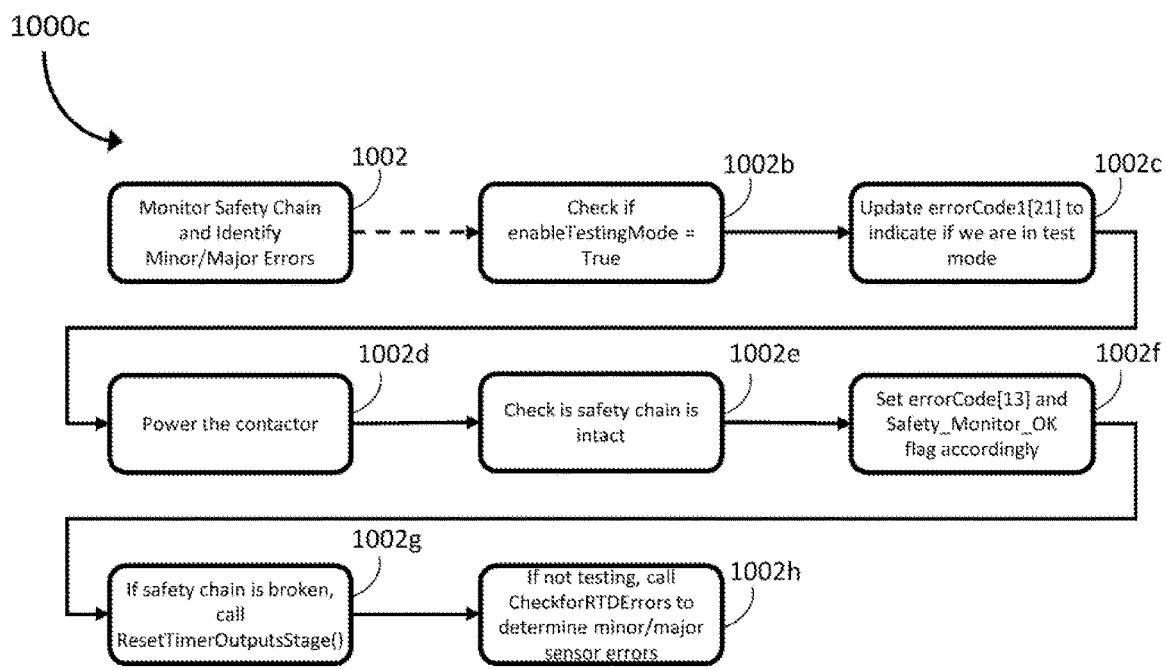

FIG. 10C is a block diagram of exemplary sub-steps method of Figure specifically the sub-steps of step 1002.

At 1002, the PLC monitors the safety chain and identifies any minor or major errors.

Step 1002 comprises substeps 1002b-1002h.

At 1002b, the PLC checks if enableTestingMode is true.

At 1002c, the PLC updates errorCode1[21] to indicate if test mode is active.

At 1002d, the PLC powers the contactor.

At 1002e, the PLC checks if the safety chain is intact.

At 1002f, the PLC sets errorCode[13] and a safety monitor flag according to the results of 1002e.

At 1002g, if the safety chain is not intact, the PLC calls ResetTimerOutputsStage( ).

At 1002h, if not in test mode, the PLC calls CheckforRTDErrors to determine if there are any minor or major sensor errors.

Figure 10D:
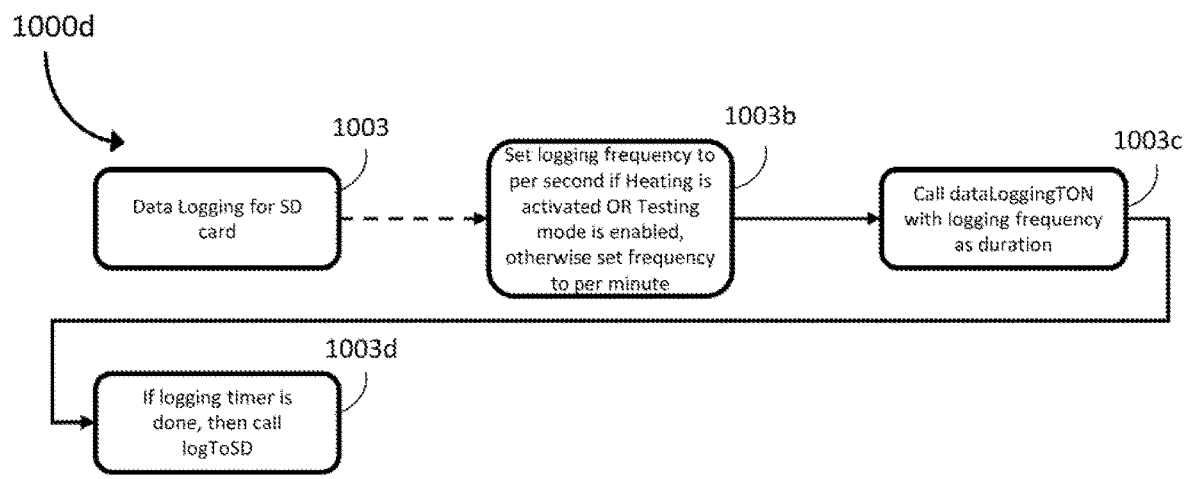

FIG. 10D is a block diagram of exemplary sub-steps of method of Figure specifically the sub-steps of step 1003.

At 1003, the PLC logs data to an SD card.

Step 1003 comprises substeps 1003b-1003d.

At 1003b, a logging frequency to the SD card is set to per second if heating has been activated or if testing mode is enabled. If heating is not active and a testing mode is not enabled, then the logging frequency is set to per minute.

At 1003c, the PLC calls dataLoggingTON with the logging frequency set to the appropriate interval as determined in 1003b.

At 1003d, if logging timer is done the PLC calls logToSD.

Figure 10E:
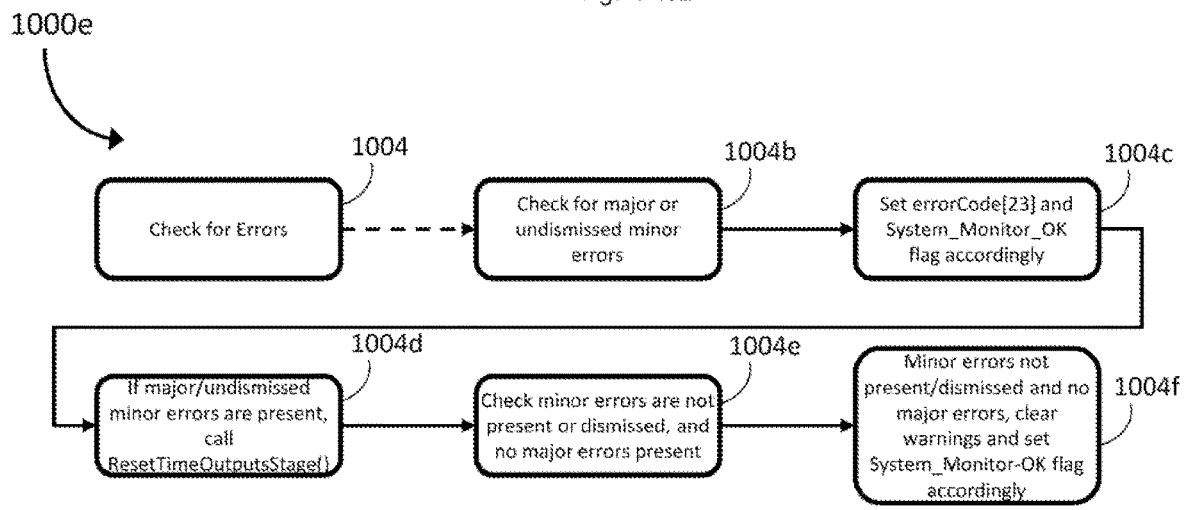

FIG. 10E is a block diagram of exemplary sub-steps of method of Figure specifically the sub-steps of step 1004.

At 1004, the PLC checks for errors.

Step 1004 comprises substeps 1004b-1004f.

At 1004b, the PLC checks for any major errors or minor undismissed errors.

At 1004c, the PLC sets errorCode[23] and System_Monitor_OK flags according to the results of 1004b.

At 1004d, if major errors or undismissed minor errors are present the PLC calls ResetTimeOutputStage( ).

At 1004e, the PLC checks that minor errors are not present or dismissed and that major errors are not present.

At 1004F, if there are no present or dismissed minor errors and no major errors, the PLC clears warnings and set the System_Monitor_OK flag appropriately.

Figure 10F:
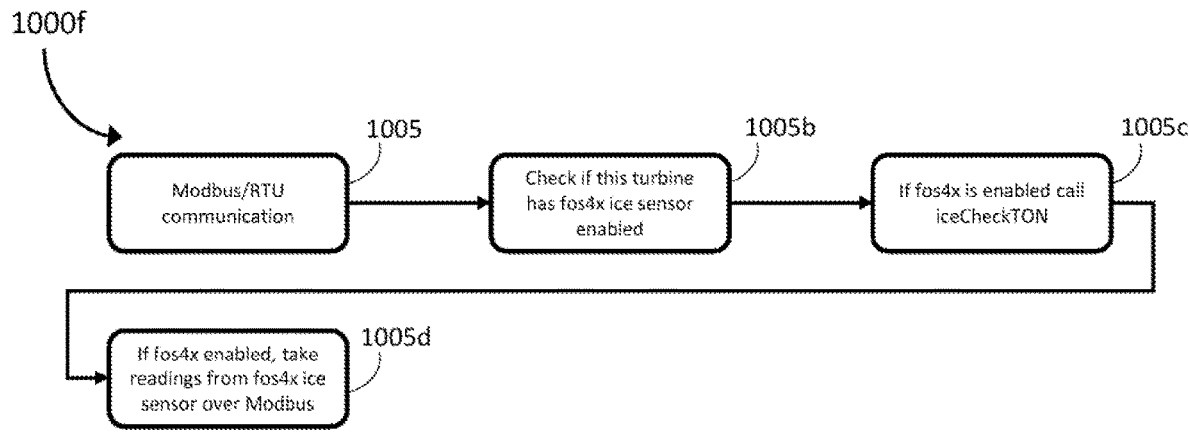

FIG. 10F is a block diagram of exemplary sub-steps of method of Figure specifically the sub-steps of step 1005.

At 1005, the PLC communicates with a Modbus/RTU.

Step 1005 comprises substeps 1005b-1005d.

At 1005b, the PLC checks if a specific wind turbine has a third party ice detection sensor enabled (i.e., a sensor that is not integrated with the operations of the wind turbine, for example a fos4x ice detection sensor). The third party ice detection sensor detects a mass of the blades of the wind turbine to determine if the mass has increased due to ice accumulation.

At 1005c, if a third party sensor is enabled the PLC calls iceCheckTON.

At 1005d, the PLC receives readings from the third party sensor over Modbus.

Figure 10G:
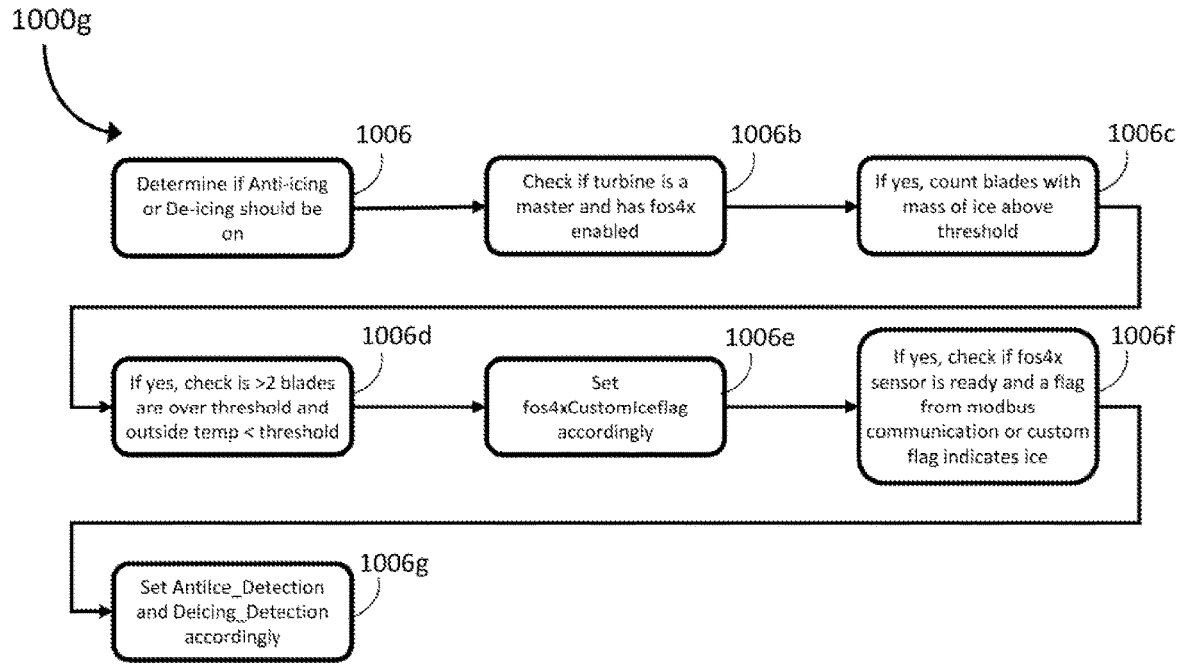

FIG. 10G is a block diagram of exemplary sub-steps of method of Figure specifically the sub-steps of step 1006.

At 1006, the PLC determines if anti-icing or de-icing should be on.

Step 1006 includes substeps 1006b-1006g.

At 1006b, the PLC checks if a specific wind turbine is a master wind turbine (i.e., a wind turbine which is used as a representative of a plurality of wind turbines) and if it has a third party ice detection sensor enabled.

At 1006c, if the answer to 1006b was yes, the PLC counts the number of blades of the wind turbine which have a mass indicating ice accumulation above a threshold value.

At 1006d, if the answer to 1006b was yes, and the number of blades above the threshold value is greater than 2 (could be another number in other embodiments), then the outside temperature is checked to determine if it is below a threshold value.

At 1006e, the PLC sets a fos4xCustomIceflag according to the results of 1006d.

At 1006f, if the answer to 1006b was yes, the PLC checks if the third party ice detection sensor is ready and if there is a flag from Modbus communication or if another custom ice flag indicates ice.

At 1006g, the PLC sets AntiIce_Detection or DeIcing_Detection accordingly.

Figure 10H:
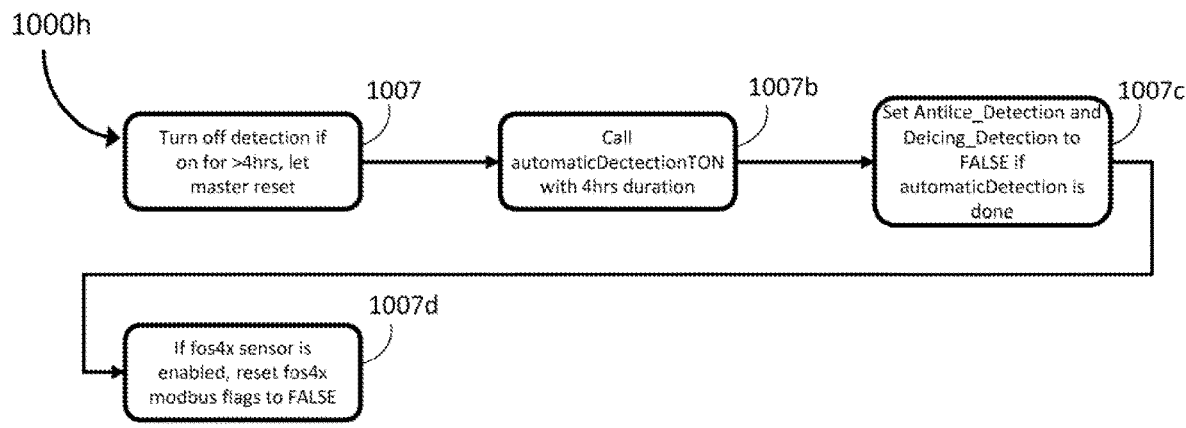
Figure 10I:
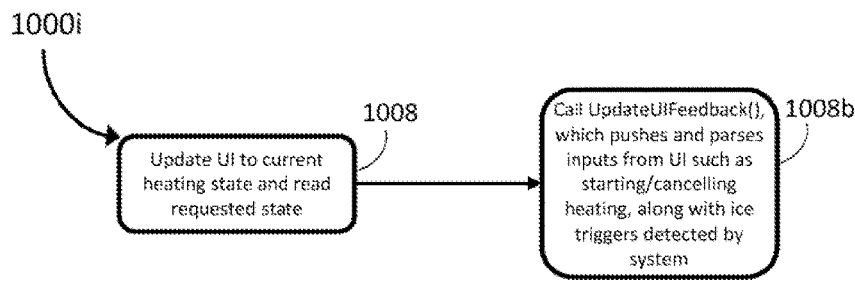

FIG. 10H is a block diagram of exemplary sub-steps of method of Figure specifically the sub-steps of step 1007.

At 1007, the PLC turns off detection if the heating system has been on for at least four hours and lets the master reset.

Step 1007 comprises substeps 1007b-1007d.

At 1007b, the PLC calls automaticDetectionTON with a four hour duration.

At 1007c, the PLC sets AntiIce_Detection and DeIcing_Detection to False if automaticDetection is done.

At 1007d, if a third party ice detection sensor is enabled for the specific wind turbine, the PLC sets the third party ice detection sensor Modbus flags to False.

Figure 10J:
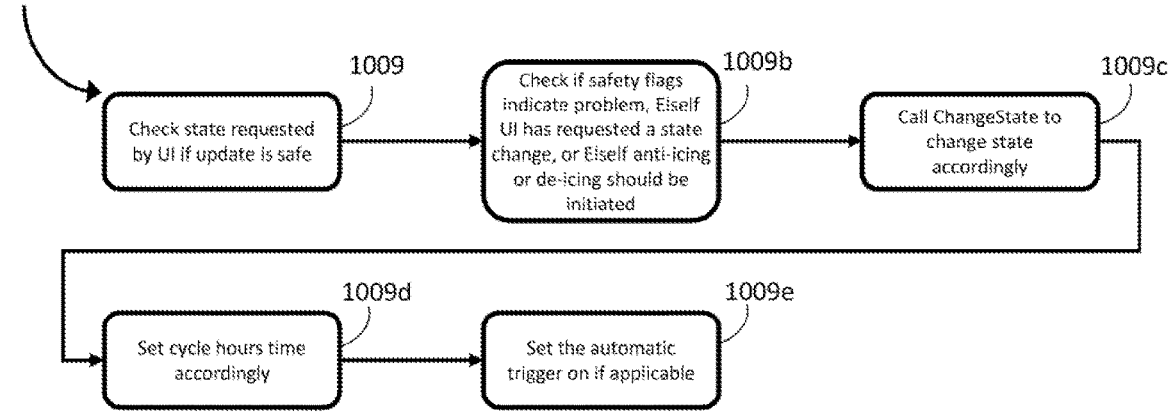
Figures 10K, 10L, 10M:
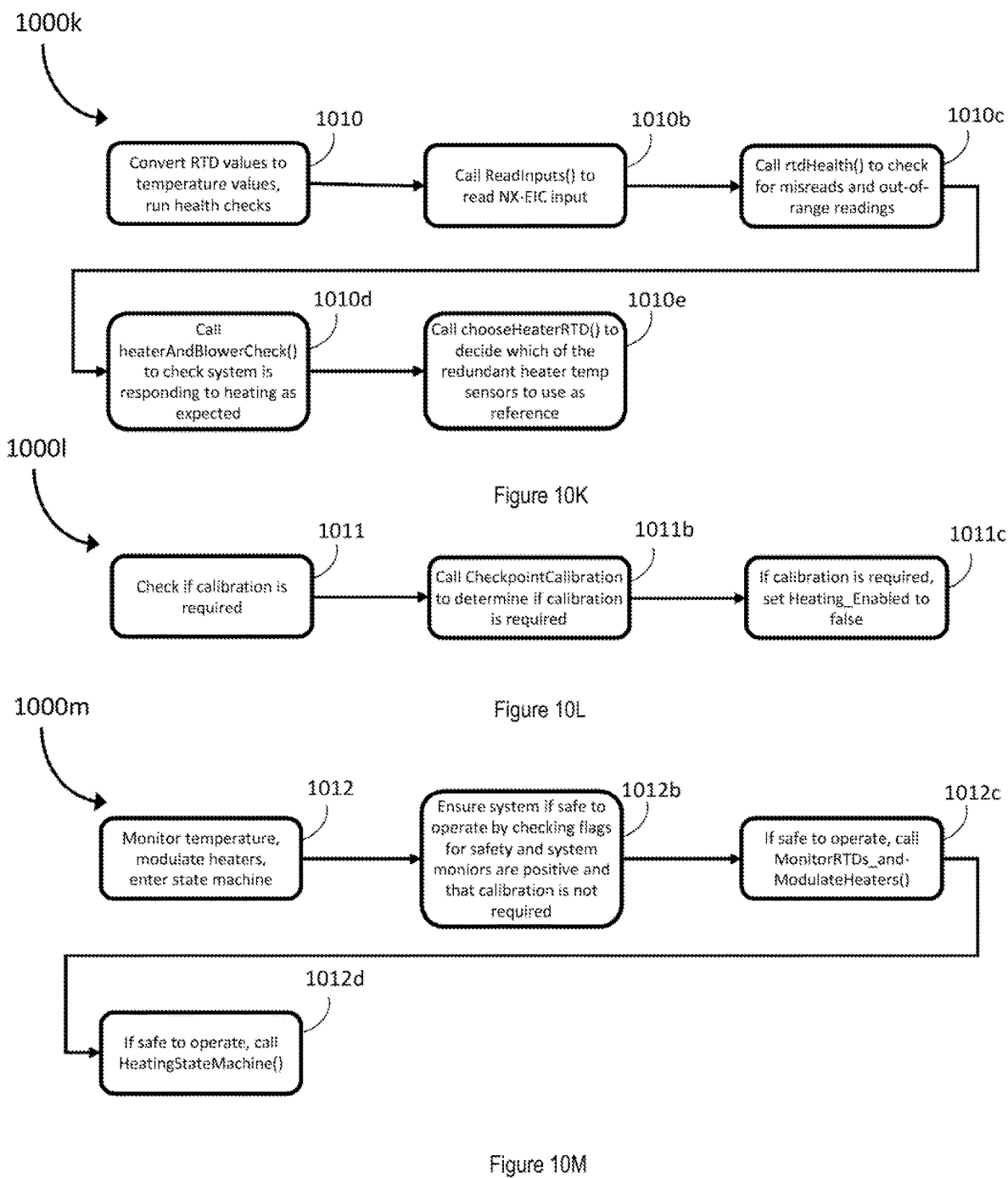

FIG. 10l is a block diagram of exemplary sub-steps of method of Figure specifically the sub-steps of step 1008.

At 1008, the user interface is updated to the current heating system state and the requested state of the heating system is read by the PLC.

Step 1008 includes substep 1008b.

At 1008b, the PLC calls UpdateUIFeedback( ) which pushes and parses inputs from the user interface such as starting or cancelling heating as well as ice triggers detected by the system.

FIG. 10J is a block diagram of exemplary sub-steps of method of Figure specifically the sub-steps of step 1009.

At 1009, the PLC checks the state requested by the user interface if the update is safe.

Step 1009 includes substeps 1009b-1009e.

At 1009b, the PLC checks if safety flags indicate a problem, if ElseIf UI has requested a state change, or if ElseIf anti-icing or de-icing should be initiated.

At 1009c, the PLC calls ChangeState to change the state of the heating system accordingly.

At 1009d, the PLC sets the cycle hours time accordingly.

At 1009e, the PLC sets the automatic trigger to on if appropriate.

FIG. 10K is a block diagram of exemplary sub-steps of method of Figure specifically the sub-steps of step 1010.

At 1010, the PLC converts RTD values to temperature values and runs health checks on the system.

Step 1010 comprises substeps 1010b-1010e.

At 1010b, the PLC calls ReadInputs( ) to read NX-IEC input.

At 1010c, the PLC calls rtdHealth( ) to check for misreads and out-of-range readings.

At 1010d, the PLC calls heaterAndBlowerCheck( ) to check system is responding to heating as expected.

At 1010e, the PLC calls chooseHeaterRTD( ) to decide which redundant heater temperature sensors to use as a reference.

FIG. 10L is a block diagram of exemplary sub-steps of method of Figure specifically the sub-steps of step 1011.

At 1011, the PLC checks if calibration is required.

Step 1011 comprises substeps 1011b and 1011c.

At 1011b, the PLC calls CheckpointCalibration to determine if calibration is required.

At 1011c, if calibration is required, the PLC sets Heating_Enabled to False.

FIG. 10M is a block diagram of exemplary sub-steps of method of Figure specifically the sub-steps of step 1012a.

At 1012, the PLC monitors temperature, modulates the heaters of the heating system, and enters the state machine.

Step 1012 comprises substeps 1012b-1012d.

At 1012b, the PLC ensures that the system is safe to operate by checking if any flags for safety and system monitors are positive and that calibration is not required.

At 1012c, if the system is safe to operate based on 1012b, the PLC calls MonitorRTDs and ModulateHeaters( ).

At 1012d, if the system is safe to operate based on 1012b, the PLC calls HeatingStateMachine( ).

Figure 11:
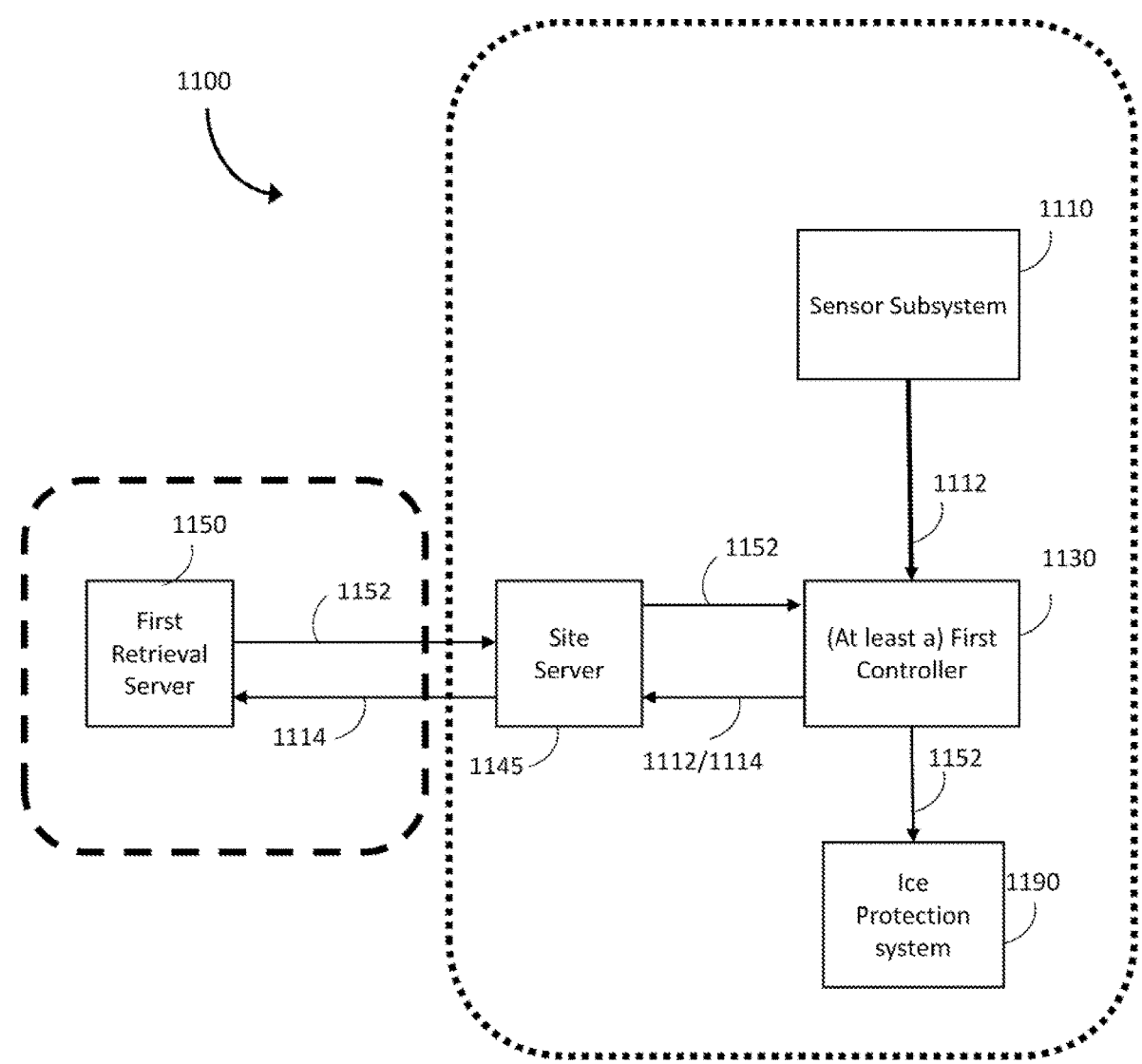
FIG. 11 is a block diagram of a basic ice protection control system for use in a wind turbine, according to an embodiment.

FIG. 11 is a block diagram of a basic ice protection control system 1100 for use in a wind turbine, according to an embodiment. The basic ice protection control system includes the minimum components required for protecting a wind turbine(s) from ice as described above in the various embodiments and methods.

Components within the dashed line are located at the control office location, i.e., a location removed from the site of the wind turbine(s). The control office location may be responsible for controlling operation of ice protection systems at multiple different wind turbine locations. Components within the dotted line are located at a wind turbine site.

The ice protection control system 1100 includes (at least) a first sensor subsystem 1110, (at least) a first controller 1130, a site server 1145, a first retrieval server 1150, and an ice protection system 1190.

Sensor subsystem 1110 includes at least one sensor. Sensor subsystem 1110 may be similar to sensors 310a of FIG. 3A, sensors 310b of FIG. 3b, and ice sensor 317 of FIG. 3b. The at least one sensor may include one or more of an ice sensor, a blade-tip temperature sensor, a mid-blade temperature sensor, a heater outlet temperature sensor, a blower inlet temperature sensor, and accelerometer, and a pressure transducer.

The ice protection control system may include multiple sensor subsystems. The multiple sensor subsystems may be within a single wind turbine. The multiple sensor subsystems may be at multiple wind turbines. The sensor subsystems may include any number of sensors.

The first controller 1130 receives raw sensor data 1112 from the first sensor subsystem 1110 and processes the raw sensor data 1112 to processed sensor data 1114. The first controller 1130 may be similar to remote PLC 330 of FIGS. 3A-B.

In some embodiments there may be more than one controller. The other controllers may be similar to main PLC 340 of FIG. 3B. The first controller 1130 is located within the wind turbine at or the location of the wind turbine. In embodiments with multiple controllers, the other controllers may be located within the wind turbine, at the location of the wind turbine, or remote from the site of the wind turbine(s).

The first controller 1130 sends the raw sensor data 1112 and the processed sensor data 1114 to the site server 1145 for storage. The site server 1145 may be similar to site server 345 of FIG. 3B. The site server 1145 receives and stores the processed sensor data. The site server 1145 is located at the location of the wind turbine. In some embodiments, there may be more than one site server.

The site server 1145 sends the processed sensor data 1114 to the first retrieval server 1150. The first retrieval server 1150 may be similar to retrieval server 350 of FIG. 3B. The first retrieval server 1150 analyses the processed sensor data 1114 and generate heating mode instructions 1152 based on the processed sensor data 1114. In some embodiments, there may be more than one retrieval servers.

The first retrieval server 1150 sends the heating mode instructions 1112 to first controller 1130 through the site server 1145. The first controller uses the heating mode instructions 1152 to control the ice protection system 1190. The ice protection system 1190 may be similar to heating system 390 of FIG. 3B.

The heating mode instructions 1152 may include instructions for ice protection measures that do not involve heating, (i.e., non-heating measures) for example, stopping the wind turbine or yawing the wind turbine.

While the above description provides examples of one or more apparatus, methods, or systems, it will be appreciated that other apparatus, methods, or systems may be within the scope of the claims as interpreted by one of skill in the art.

What is claimed is:

1. An ice protection control system for controlling wind turbine ice protection systems of at least one wind turbine, the system comprising:
   a first sensor subsystem of a first wind turbine, the first sensor subsystem including at least one sensor for collecting raw sensor data;
   at least a first controller communicatively connected to the first sensor subsystem and an ice protection system of the first wind turbine, the at least a first controller configured to:
      receive the raw sensor data from the at least one sensor;
      generate processed sensor data from the raw sensor data;
   a site server at the location of the first wind turbine configured to receive and store the raw sensor data and the processed sensor data; and
   a first retrieval server at a location remote from the location of the first wind turbine, the first retrieval server configured to:
      receive the processed sensor data from the site server;
      analyse the processed sensor data; and
      generate heating mode instructions based on the analyzed processed sensor data and send the heating mode instructions to the at least a first controller;
   and wherein the at least a first controller is further configured to control a heating mode of the ice protection system according to the received heating mode instructions.

2. The system of claim 1, wherein the first sensor subsystem includes at least one temperature sensor.

3. The system of claim 1, wherein the first sensor subsystem includes at least one sensor chosen from the group consisting of: a blade-tip temperature sensor, a mid-blade temperature sensor, a blower inlet temperature sensor, an accelerometer, a pressure transducer, an ice sensor, a current sensor, a voltage sensor, an air velocity sensor, and an air pressure sensor.

4. The system of claim 1, wherein the at least a first controller comprises a programmable logic controller.

5. The system of claim 1, wherein the at least a first controller comprises a first controller and a second controller.

6. The system of claim 5, wherein the second controller is a programmable logic controller.

7. The system of claim 5, wherein the first controller receives voltage signals from the at least a first sensor and converts the voltage signals to digital signals to be sent to the second controller.

8. The system of claim 5 wherein the at least a first sensor comprises a first sensor and a second sensor wherein the first controller receives voltage signals from the first sensor and the second controller receives signals from the second sensor.

9. The system of claim 1, further comprising a database server which receives and stores data from the at least a first controller and the first retrieval server.

10. The system of claim 1, wherein the first retrieval server is configured to actively retrieve data from the at least a first controller.

11. The system of claim 1, wherein the first retrieval server receives processed sensor data from a plurality of controllers each representative of a different wind turbine or wind turbine blade.

12. The system of claim 1, wherein the at least a first controller is a device chosen from the group consisting of: a microcontroller, an industrial personal computer, a remote telemetry unit, a programmable automation controller, an embedded controller, an ethernet I/O module, or a smart relay.

13. The system of claim 1, further comprising a safety chain subsystem configured to shut down the ice protection system when errors occur.

14. The system of claim 1, wherein the at least one wind turbine includes a plurality of wind turbines, wherein each wind turbine of the plurality of wind turbines includes at least a first controller and an ice protection system, wherein the first retrieval server is further configured to generate heating mode instructions based on the analyzed processed sensor data and send the heating mode instructions to the at least a first controller of each wind turbine of the plurality of wind turbines.

15. The system of claim 1, wherein the at least one wind turbine includes a plurality of wind turbines, wherein each wind turbine of the plurality of wind turbines includes an ice protection system, a sensor subsystem for collecting raw sensor data, and at least a first controller for receiving the raw sensor data and generating processed sensor data, and wherein:
the site server receives processed data from each of the at least a first controllers;
the first retrieval server receives and analyses the processed sensor data, generates heating mode instructions based on the analyzed processed sensor data and sends the heating mode instructions to the at least a first controllers; and
wherein the at least a first controllers are further configured to control a heating mode of the ice protection systems according to the received heating mode instructions.

16. The system of claim 15 wherein the heating mode of the ice protection system of each of the plurality of wind turbines is individually controlled based off of the raw sensor data of the respective wind turbine.

17. The system of claim 15 wherein the heating mode of the ice protection system of each of the plurality of wind turbines is collectively controlled based off of pooled raw sensor data from all of the wind turbines.

18. The system of claim 1, wherein the at least one wind turbine includes a plurality of wind turbines, wherein each wind turbine of the plurality of wind turbines includes an ice protection system, and at least a first controller, and wherein a subset of the plurality of wind turbines each include a sensor subsystem for collecting raw sensor data, wherein the at least a first controller of each wind turbine of the subset of wind turbines is configured to receive the raw sensor data and generate processed sensor data, and wherein:
the site server receives processed sensor data from each of the at least a first controllers of the subset of wind turbines;
the first retrieval server receives and analyses the processed sensor data, generates heating mode instructions based on the analyzed processed sensor data and sends the heating mode instructions to the at least a first controllers of the plurality of wind turbines; and
wherein the at least a first controllers of the plurality of wind turbines are further configured to control a heating mode of the ice protection systems according to the received heating mode instructions.

19. The system of claim 1 wherein the first retrieval server is further configured to initiate non-heating ice protection measures for at least one wind turbine.

20. A method for using an ice protection control system for controlling wind turbine ice protection systems of at least one wind turbine, the method comprising:
collecting raw sensor data from a first sensor subsystem of a first wind turbine, the first sensor subsystem comprising at least one sensor;
receiving the raw sensor data from the at least one sensor by at least a first controller, wherein the at least a first controller is communicatively connected to the first sensor subsystem and an ice protection system of the first wind turbine;
generating processed sensor data from the raw sensor data by the at least a first controller;
receiving and storing the raw sensor data and processed sensor data by a site server at the location of the first wind turbine;
receiving the processed sensor data from the site server by a first retrieval server at a location remote from the location of the first wind turbine;
analyzing the processed sensor data by the first retrieval server; and
generating heating mode instructions, based on the analyzed processed sensor data, by the first retrieval server;
sending the heating mode instructions to the at least a first controller by the first retrieval server; and
controlling a heating mode of the ice protection system, according to the received heating mode instructions, by the at least a first controller.

* * * * *